United States Patent
McClure, Jr. et al.

(10) Patent No.: US 11,864,499 B2
(45) Date of Patent: Jan. 9, 2024

(54) AUTOMATED LAWN APPLICATION CONTROL SYSTEM AND METHODS THEREFOR

(71) Applicant: ALACS, LLC, Roswell, GA (US)

(72) Inventors: James G McClure, Jr., Milton, GA (US); Mehrdad Arefi Nezhad, Alpharetta, GA (US); Mehdi Hashemi, Alpharetta, GA (US)

(73) Assignee: ALACS, LLC, Roswell, GA (US)

( * ) Notice: Subject to any disclaimer, the term of this patent is extended or adjusted under 35 U.S.C. 154(b) by 0 days.

(21) Appl. No.: 17/931,204

(22) Filed: Sep. 12, 2022

(65) Prior Publication Data

US 2023/0320289 A1 Oct. 12, 2023

Related U.S. Application Data

(63) Continuation of application No. PCT/US2022/023800, filed on Apr. 7, 2022.
(Continued)

(51) Int. Cl.
*A01G 20/30* (2018.01)
*B05B 7/24* (2006.01)
(Continued)

(52) U.S. Cl.
CPC ............ *A01G 20/30* (2018.02); *B05B 7/0093* (2013.01); *B05B 7/2402* (2013.01);
(Continued)

(58) Field of Classification Search
CPC ..... B05B 7/0093; B05B 7/2402; B05B 9/007; B05B 15/20; A01G 20/30;
(Continued)

(56) References Cited

U.S. PATENT DOCUMENTS 3,722,820 A 3/1973 Klint
3,857,515 A 12/1974 Zennie
(Continued)

FOREIGN PATENT DOCUMENTS

WO WO-2016103071 A1 * 6/2016 ........... A01C 21/007
WO WO-2016202290 A1 * 12/2016 ............. A01D 34/64
WO 2020064087 A1 4/2020

OTHER PUBLICATIONS

International Search Report for International Application No. PCT/US2022/023800 dated Jul. 13, 2022.
(Continued)

*Primary Examiner* — Darren W Gorman
(74) *Attorney, Agent, or Firm* — Perilla Knox & Hildebrandt LLP; Kenneth A. Knox

(57) ABSTRACT

A system and method for automated lawn chemical treatment application are described. The system comprises a station having a series of concentrated chemicals capable of being mixed and diluted in a reservoir having a water supply to form a specialty formula and a vehicle which receives the specialty formula for dispersal. Various features of the vehicle enable a systematic treatment of various plants and/or areas of a law to reduce or eliminate the growth of unwanted plants while promoting the growth of desired plants. These may include the addition of imaging sensors and artificial intelligence to recognize unwanted plants versus desirable plants and develop means to inhibit or grow each over a specified period. A homeowner's ability to consistently treat plants with low-volumes of chemical treatments is enhanced, thus limiting environmental effects and reducing chemical waste.

20 Claims, 22 Drawing Sheets

Related U.S. Application Data

(60) Provisional application No. 63/217,236, filed on Jun. 30, 2021.

(51) Int. Cl.
  *B64D 1/18* (2006.01)
  *B64C 39/02* (2023.01)
  *B05B 7/00* (2006.01)
  *B64U 30/20* (2023.01)
  *B64U 50/19* (2023.01)

(52) U.S. Cl.
  CPC .............. *B64C 39/024* (2013.01); *B64D 1/18* (2013.01); *B64U 30/20* (2023.01); *B64U 50/19* (2023.01)

(58) Field of Classification Search
  CPC . B64D 1/16–1/20; B64D 1/18; B64C 39/024; B64U 30/20; B64U 50/19
  See application file for complete search history.

(56) References Cited

U.S. PATENT DOCUMENTS

| | | |
|---|---|---|
| 3,017,121 A | 1/1979 | Carlson |
| 5,323,593 A | 6/1994 | Cline et al. |
| 5,444,965 A | 8/1995 | Colens |
| 6,553,299 B1 | 4/2003 | Keller et al. |
| 6,611,738 B2 | 8/2003 | Ruffner |
| 8,857,137 B2 | 10/2014 | Avnery |
| 9,237,689 B2 | 1/2016 | Choi et al. |
| 10,478,841 B2* | 11/2019 | Harris ...................... B05B 9/007 |
| 2002/0011813 A1 | 1/2002 | Koselka et al. |
| 2007/0264138 A1* | 11/2007 | Mandell ................... B05B 7/32 417/382 |
| 2013/0192184 A1 | 8/2013 | Choi et al. |
| 2015/0034076 A1* | 2/2015 | Dyche .................. B05B 12/004 128/200.16 |
| 2016/0016128 A1* | 1/2016 | Cink ...................... A01M 1/2038 366/150.1 |
| 2019/0292736 A1* | 9/2019 | Zagorsky ................ E01C 23/22 |
| 2021/0368696 A1* | 12/2021 | Friell ................... A01B 69/008 |

OTHER PUBLICATIONS

Written Opinion for International Application No. PCT/US2022/023800 dated Jul. 13, 2022.

* cited by examiner

AUTOMATED LAWN APPLICATION CONTROL SYSTEM AND METHODS THEREFOR

CROSS-REFERENCE TO RELATED APPLICATIONS

This application is a bypass continuation of International Application No. PCT/US2022/023800 filed Apr. 7, 2022, which claims the benefit of and priority to U.S. Provisional Patent Application No. 63/217,236 entitled "AUTOMATED LAWN APPLICATION CONTROL SYSTEM," filed Jun. 30, 2021, the contents of both of which being incorporated by reference in their entireties herein.

BACKGROUND

Since the lawncare industry began in the 1960s, lawn treatments and, more specifically, fertilizer and weed treatments, have been performed by diluting concentrated products (e.g., liquid fertilizers and weed control products) with large quantities of water in storage tanks and driving the diluted products with heavy trucks to properties of customers. A maximum of twenty to thirty properties per day can be treated with a typical truck and application technician. This method, where each step is performed manually, requires duplication of the entire application system, including truck, equipment, and labor for each five-hundred to six-hundred customers served per round of applications. After driving to a property of a customer, one or more technicians manually reel off long sections of heavy hose, dragging the heavy hose to a far end of a property. The one or more technicians then manually spray a lawn using pumps (often gasoline powered) to spray the product solution that was mixed at an off-site location and hauled to the site. When the application is complete, the one or more technicians reel up the hose and repeat the process for other customers.

Lawn treatment applications are performed every six to eight weeks regardless of temperature, rainfall, or conditions specific to individual needs for a property. Each lawn receives the same mixture of products unless a technician recognizes a unique disease or pest problem. This often requires spraying the lawn again with a specialty product using a backpack style sprayer. If problems arise or conditions change between regularly scheduled applications, a re-treatment is required creating a separate an often expensive visit. Re-treatments are complicated logistically because once a technician leaves the area, they must revise their regularly-scheduled route and drive to one property out of their area. The entire truck and manual application method requires a great deal of labor (which is expensive and hard-to-staff) and further requires fleets of heavy vehicles and equipment to haul and apply the products. As such, there are other significant issues with the current model, such as exposure to pesticides by a technician, gasoline consumption, and carbon emissions for the truck and pump system, added traffic congestion and applicator errors in recognition and treatment of certain lawn conditions, among others.

BRIEF SUMMARY

In a first aspect a system for treatment of a lawn or other area includes at least one computing device comprising at least one hardware processor, a retrieval and charging station, and a vehicle. The retrieval and charging station includes a plurality of container receptacles; a plurality of containers configured to be detachably attached to the container receptacles; a mixing reservoir fluidly connected to the containers; at least one charging contact; a networking module configured to communicate with the at least one computing device remotely over a network; and processing circuitry configured to retrieve a mixing formula from the at least one computing device and selectively direct portions of liquid from the plurality of containers into the mixing reservoir such that the portions of the liquid are mixed, thereby generating a treatment solution in accordance with the mixing formula.

The vehicle includes a vehicle reservoir; a battery; processing circuitry configured to engage with the at least one charging contact to initiate a charging of the battery of the vehicle and fluidly engage with the mixing reservoir to fill the vehicle reservoir with the treatment solution; and an applicator configured to treat the lawn or the other area with the treatment solution as the vehicle navigates the lawn or the other area.

The at least one computing device may include program instructions stored in memory that, when executed, direct the at least one computing device to generate the mixing formula based on a list of the containers, a solution level of solution in respective ones of the containers, and environmental data associated with a location of at least one of the retrieval and charging station and the vehicle.

Each of the containers may include a radio-frequency identification (RFID) tag that emits an identifier for a respective one of the containers, and the processing circuitry of the retrieval and charging station may be configured to correlate the identifier with a database of identifiers to identify contents of the respective one of the containers.

In a second aspect, a system for treatment of a lawn or other area includes a retrieval and charging station comprising a plurality of containers detachably attachable to the retrieval and charging station, a mixing reservoir fluidly connected to the containers, at least one charging contact, and processing circuitry configured to selectively direct portions of liquid from the plurality of containers into the mixing reservoir such that the portions of the liquid are mixed, thereby generating a treatment solution; and a vehicle configured to traverse the lawn or the area, the vehicle comprising a vehicle reservoir, a battery, and processing circuitry configured to engage with the at least one charging contact to initiate a charging of the battery of the vehicle and fluidly engage with the mixing reservoir to fill the vehicle reservoir with the treatment solution, where the vehicle further comprises an applicator configured to navigate the lawn or the other area and treat the area with the treatment solution.

The retrieval and charging station may include a networking module; the processing circuitry of the retrieval and charging station may be configured to communicate with at least one remote computing device via the networking module over a network to retrieve mixing instruction data remotely from the retrieval and charging station; and the mixing instruction data may instruct the processing circuitry of the retrieval and charging station to selectively direct the portions of the liquid from the plurality of containers in accordance with a predetermined mixing formula.

The at least one remote computing device may include program instructions stored in memory that, when executed, direct the at least one computing device to generate the mixing instruction data based on a list of the containers, a solution level of solution in respective ones of the containers, and environmental data associated with a location of at least one of the retrieval and charging station and the vehicle.

The vehicle may further include a networking module; the processing circuitry of the vehicle may be configured to communicate with the retrieval and charging station via respective networking modules to notify the retrieval and charging station of a current level of the vehicle reservoir; and the processing circuitry of the retrieval and charging station may pump an amount of the treatment solution to the vehicle based at least in part on the current level of the vehicle reservoir. The applicator may include a sprayer.

The system may include a land-based vehicle comprising a plurality of wheels, the processing circuitry of the land-based vehicle being configured to direct the land-based vehicle to traverse the lawn or the other area and apply the treatment solution. The system may include an unmanned aerial vehicle (UAV) comprising a plurality of rotors, the processing circuitry of the unmanned aerial vehicle being configured to direct the land-based vehicle to fly above the lawn or the other area and apply the treatment solution at a predetermined height relative to a ground surface.

Each of the containers may include a radio-frequency identification (RFID) tag that emits an identifier for a respective one of the containers, and the processing circuitry of the retrieval and charging station may be configured to correlate the identifier with a database of identifiers to identify contents of the respective one of the containers. Each of the containers may include an air-flow valve that enables solution contained therein to be gravity-fed to tubing of the retrieval and charging station.

In a third aspect, a method for treatment of a lawn or other area, includes: providing a retrieval and charging station; positioning a plurality of containers detachably attachable to the retrieval and charging station; selectively diverting, by the retrieval and charging station, portions of liquid from the plurality of containers into a mixing reservoir such that the portions of the liquid are mixed, thereby generating a treatment solution; providing a vehicle configured to traverse the lawn or the area; in response to the vehicle engaging with the retrieval and charging station or a portion thereof, fluidly engaging the vehicle with the mixing reservoir and filling the vehicle reservoir with the treatment solution; and directing the vehicle to navigate the lawn or the other area and treat the area with the treatment solution via an applicator.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A system and method for automated lawn chemical treatment application are described. The system includes a station having a series of concentrated chemicals capable of being mixed and diluted in a reservoir having a water supply to form a specialty formula and a vehicle which receives the specialty formula for dispersal. Various features of the vehicle enable a systematic treatment of various plants and/or areas of a law to reduce or eliminate the growth of unwanted plants while promoting the growth of desired plants. These may include the addition of imaging sensors and artificial intelligence to recognize unwanted plants versus desirable plants and develop means to inhibit or grow each over a specified period. A homeowner's ability to consistently treat plants with low-volumes of chemical treatments is enhanced, thus limiting environmental effects and reducing chemical waste.

Figure 6:
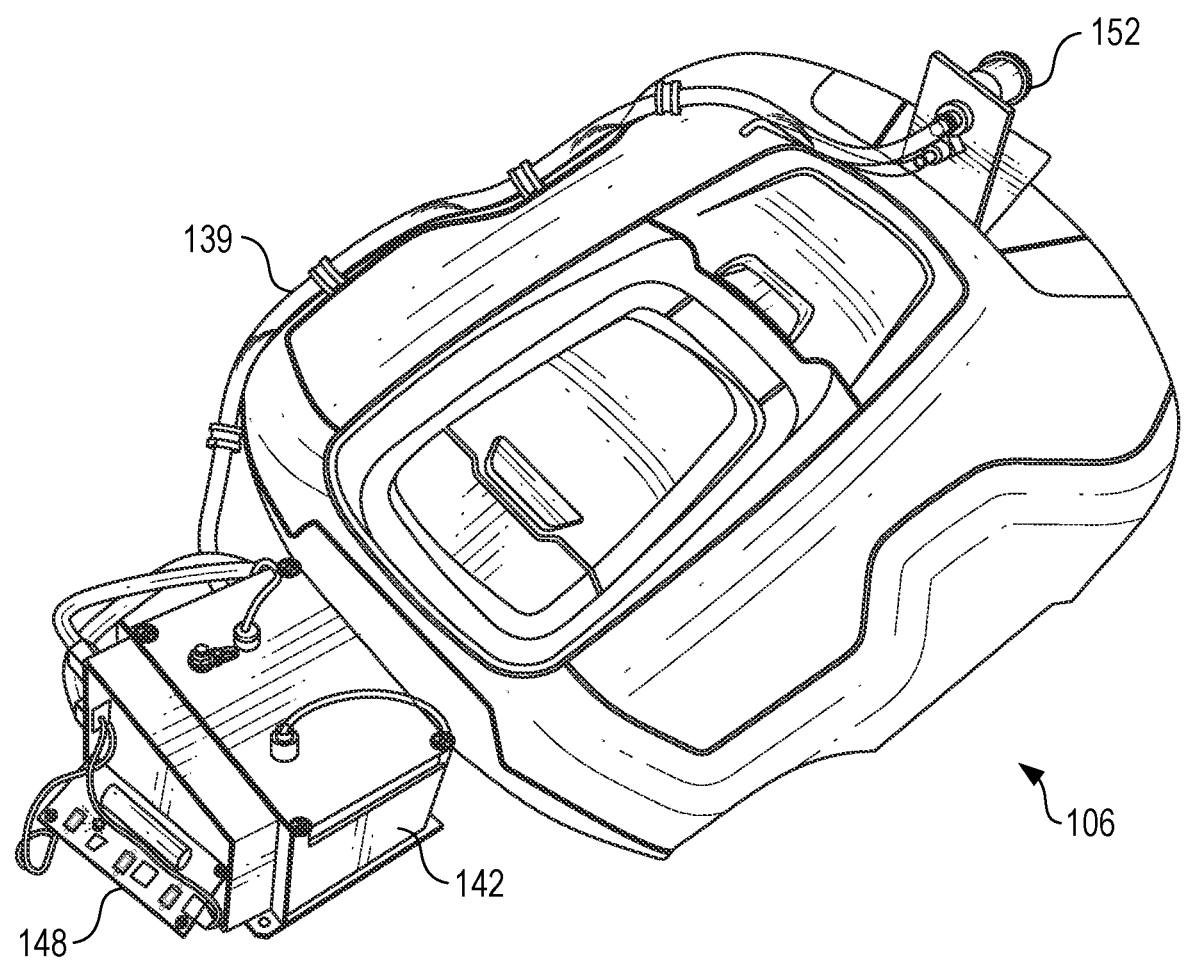
FIGS. 6-10 are other examples of the system for automated lawn chemical treatment having a vehicle and a retrieval and charging station according to various embodiments.
Figure 7:
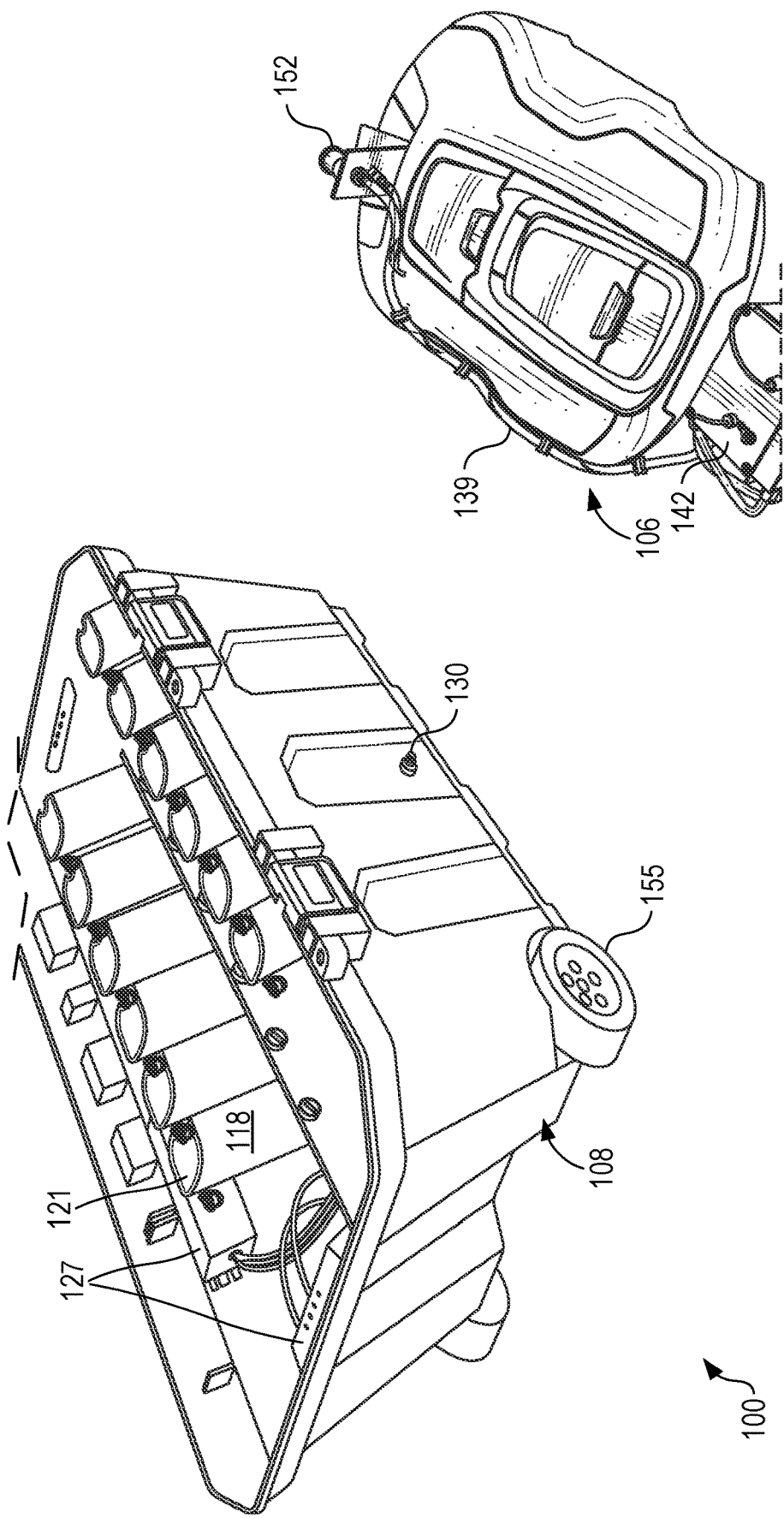
Figure 8:
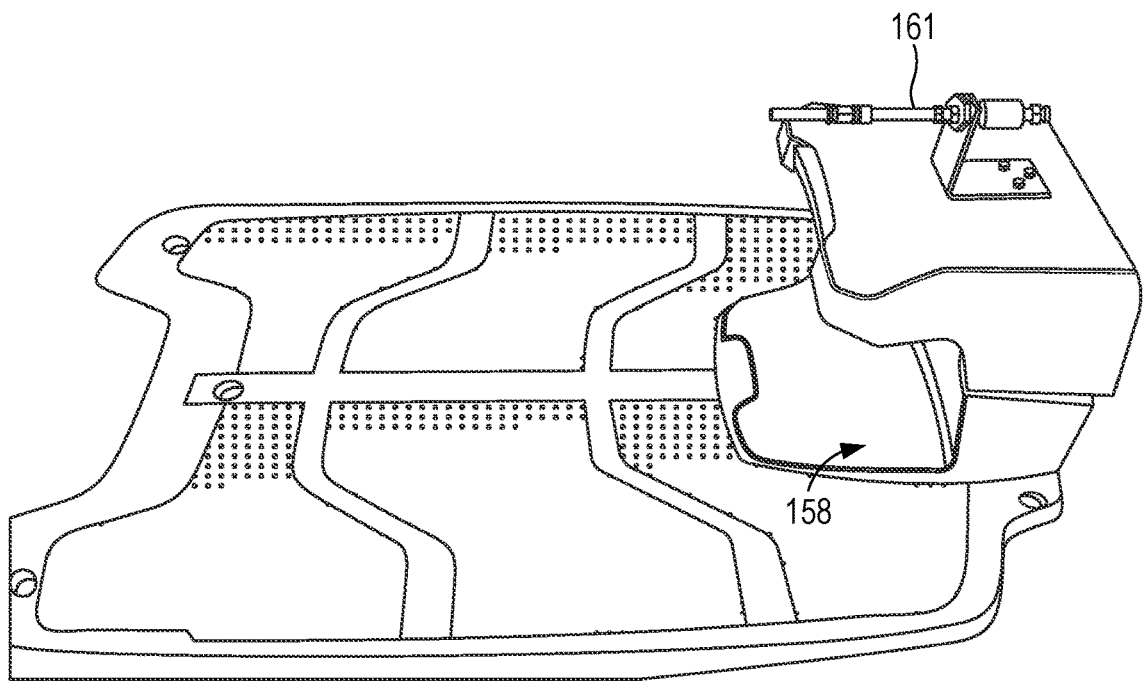
Figure 9:
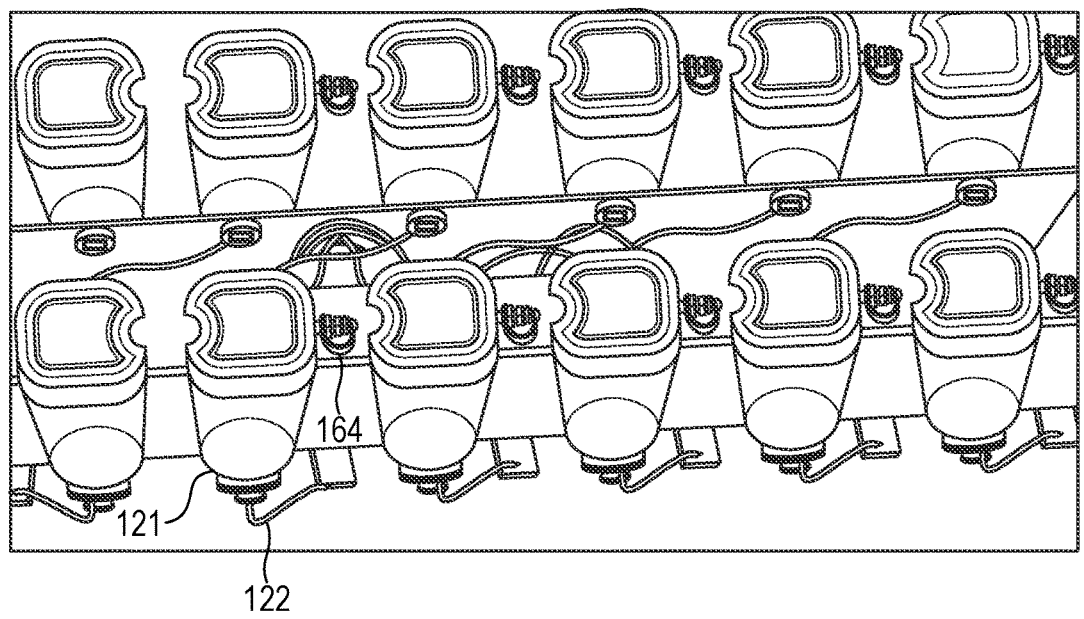
Figure 10:
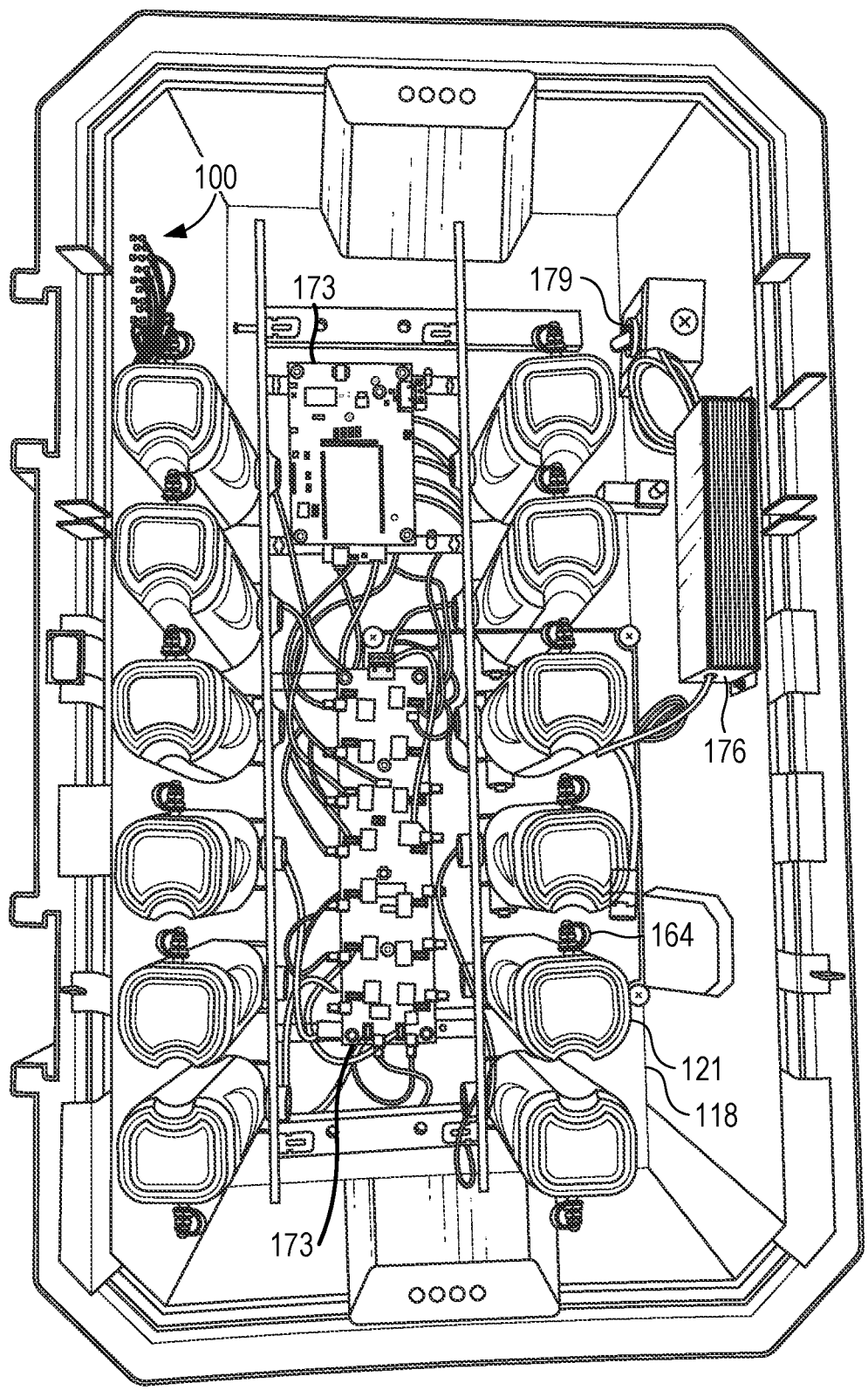

Turning now to FIGS. 1-10, an example of a system 100 for automated lawn chemical treatment applications is described. The system 100 may include a retrieval and charging station 103 and a vehicle 106. While the retrieval and charging station 103 is shown in FIGS. 1-5 and other various embodiments as a single station, in some embodiments, the retrieval and charging station 103 may include, for example a retrieval station and a charging station or, in other words, two stations distinct from one another, as shown in FIGS. 6, 7, and 10.

Referring to FIGS. 1-10 collectively, the retrieval and charging station 103 may include a solution retrieval portion 108 and a charging portion 109. The solution retrieval portion 108 may include a housing 112 having a housing interior 115 that may be accessed via a lid 117 or other securing mechanism. The housing interior 115 may include one or more container receptacles 118 positioned therein. One or more containers 121 may be configured to be detachably attach to the container receptacles 118. For instance, a container 121 may nest in or otherwise engage with a respective one of the container receptacles 118 such that the container 121 becomes fluidly coupled to tubing 122, a mixing reservoir 124, and/or other components, as will be described. In some embodiments, the containers 121 form a snap connection, an interference fit, a magnetic connection, a threaded connection, or other suitable connection with the container receptacles 118. As such, the container 121 may be removed from the housing interior 115 by pulling, turning, and/or otherwise disconnecting a container 121 from a container receptacle 118.

In various embodiments, the retrieval and charging station 103 includes a radio-frequency identification (RFID) reader and each of the containers 121 may include an RFID tag. By inserting a container 121 into a container receptacle 118, processing circuitry of the retrieval and charging station 103 may identify a container 121 based on an identifier emitted by the RFID and read by the RFID reader. As such, the retrieval and charging station 103 and/or a remote computing device in communication therewith may correlate the identifier with a database of identifiers to identify the contents of the container 121 (e.g., a type or brand name of fertilizer, growth inhibitor, growth promoter, and so forth, as will be described). The retrieval and charging station 103 may further use the RFID or other identifier to ensure quality solutions are being used, preventing solutions from being used from unauthorized containers 121. This may ensure that chemicals are not dispersed that are not authorized by a suitable entity.

The mixing reservoir 124 may include a tank, such as a plastic or a metal tank. Liquid or other content of the containers 121 may be selectively pumped to the mixing reservoir 124 or other area (potentially with water via water inlet 130) by processing circuitry, for example, to generate a treatment solution in accordance with a mixing formula, as will be described. In some embodiments, the mixing reservoir 124 houses one gallon to five gallons of liquid or content, such as 1.0, 1.5, 2.0, 2.5, 3.0, 3.5, 4.0, 4.5, and 5.0 gallons. In various embodiments, the water inlet 130 may include a threaded connection that permits a standard garden hose to hook up the solution retrieval portion 108 to a water hose water supply, although other types of inlets may be employed. In some embodiments, the mixing reservoir 124 includes only water (and no chemicals) received, for example, from the water inlet 130, such that the vehicle 106 only irrigates using water.

Additionally, the housing interior 115 may include an electrical box 127 or other container having processing circuitry, a pump, a power supply, and so forth. The electrical box 127 or other container may be waterproof or water resistant such that any components stored therein remain dry and operational. The housing interior 115 may include tubing that connects individual containers 121 to the mixing reservoir 124 as well as a water inlet 130 to the mixing reservoir 124. As such, the mixing reservoir 124 may be described as being fluidly connected or fluidly coupled to the containers 121 and the water inlet 130. As shown in FIGS. 1-5, in some embodiments, the solution retrieval portion 108 may be raised from a ground surface via legs 132 or other extended support mechanisms, such that the vehicle 106 may navigate underneath the solution retrieval portion 108 in order to contact the charging portion 109 and retrieve solution, as will be described.

The charging portion 109 may include one or more electrical contacts configured to engage with respective one or more electrical contacts of the vehicle 106. The charging portion 109 may be connected to a power supply (e.g., a power grid) via a power cable (not shown), which may include an alternating current (AC) or direct current (DC) power cable. When engaged with the electrical contacts, a battery of a vehicle 106 may be charged, as may be appreciated.

Referring again to the retrieval and charging station 103, the retrieval and charging station 103 may include a networking module, which may include a networking card (e.g., an Ethernet or NIC card) or a networking component of a microcontroller that may be coupled to a network (e.g., the Internet) via a wired or wireless connection. In various embodiments, the retrieval and charging station 103 may be configured to communicate with a remote computing environment made up of one or more computing devices remotely over a network, as will be described with respect to FIG. 15.

In various embodiments, the retrieval and charging station 103 may include processing circuitry configured to receive a mixing formula (comprising mixing instructions) from the remote computing environment that directs the processing circuitry of the retrieval and charging station 103 to selectively pump or otherwise direct specific portions of liquid from the containers 121 into the mixing reservoir 124 such that the portions of the liquid are mixed, thereby generating a treatment solution in accordance with the mixing formula. The rate at which liquid is pumped may be specified such that an agitation in the mixing reservoir 124 is created sufficient to mix and create the treatment solution, as may be understood.

The vehicle 106 may include a networking module, processing circuitry, a vehicle reservoir 133, and one or more sensors configured to detect a level of solution within the vehicle reservoir 133. To this end, when the vehicle 106 is engaged with the retrieval and charging station 103, a vehicle reservoir 133 may be filled with a treatment solution or other contents of the mixing reservoir 124. In some embodiments, the retrieval and charging station 103 may receive a communication from a networking module of the vehicle 106 that indicates an amount of solution remaining in the vehicle reservoir 133, whether the vehicle reservoir 133 is filled or empty, or the like. Based on the communication, the vehicle 106 may pump or otherwise divert an amount to fill the vehicle reservoir 133 to a predetermined level (e.g., full, half full, battery optimized level, and so forth), for instance, based on a current amount in the vehicle reservoir 133.

Figure 2:
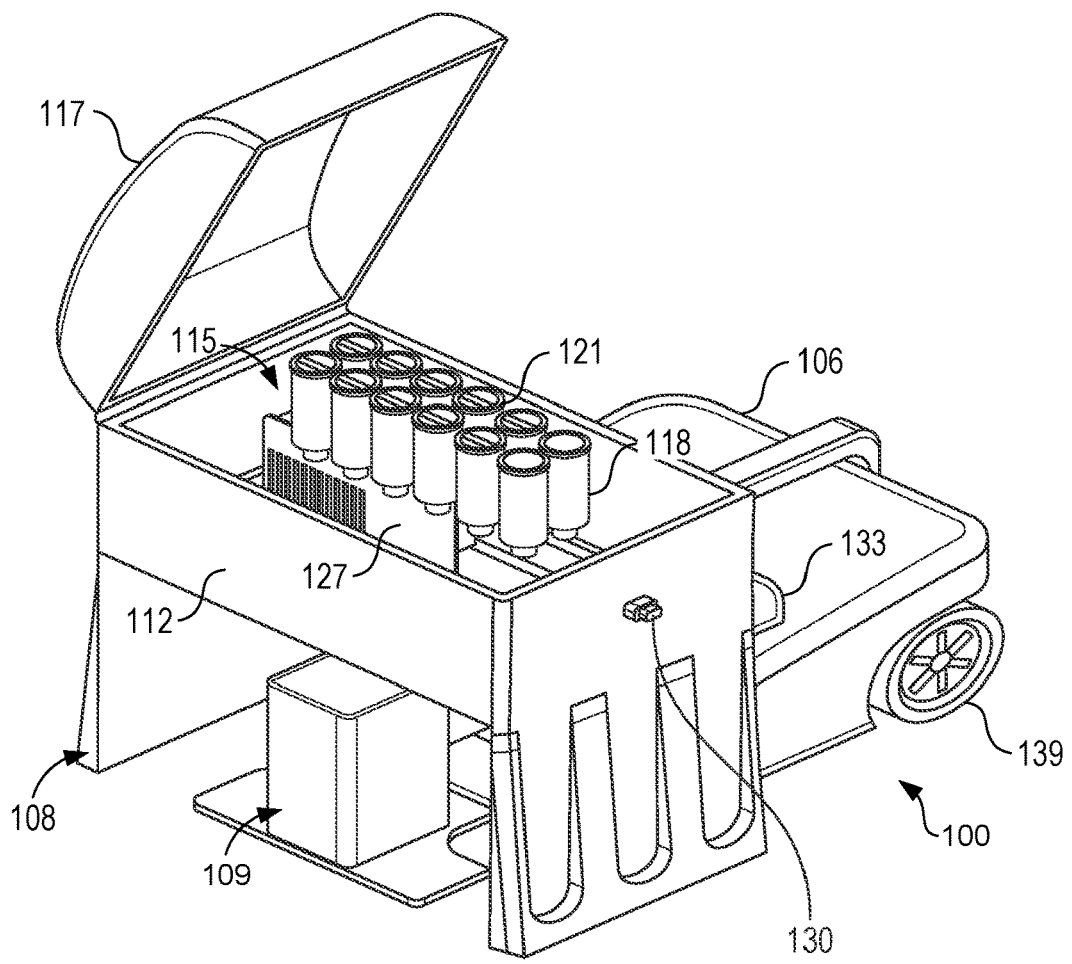
Figure 3:
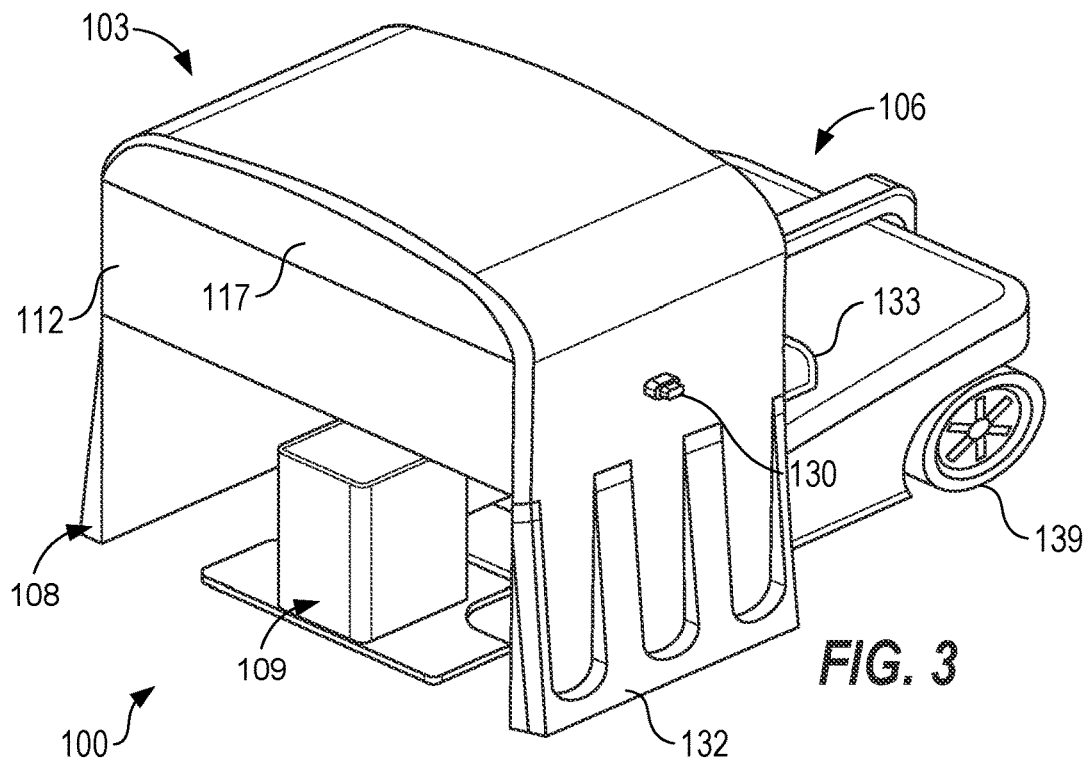
Figure 4:
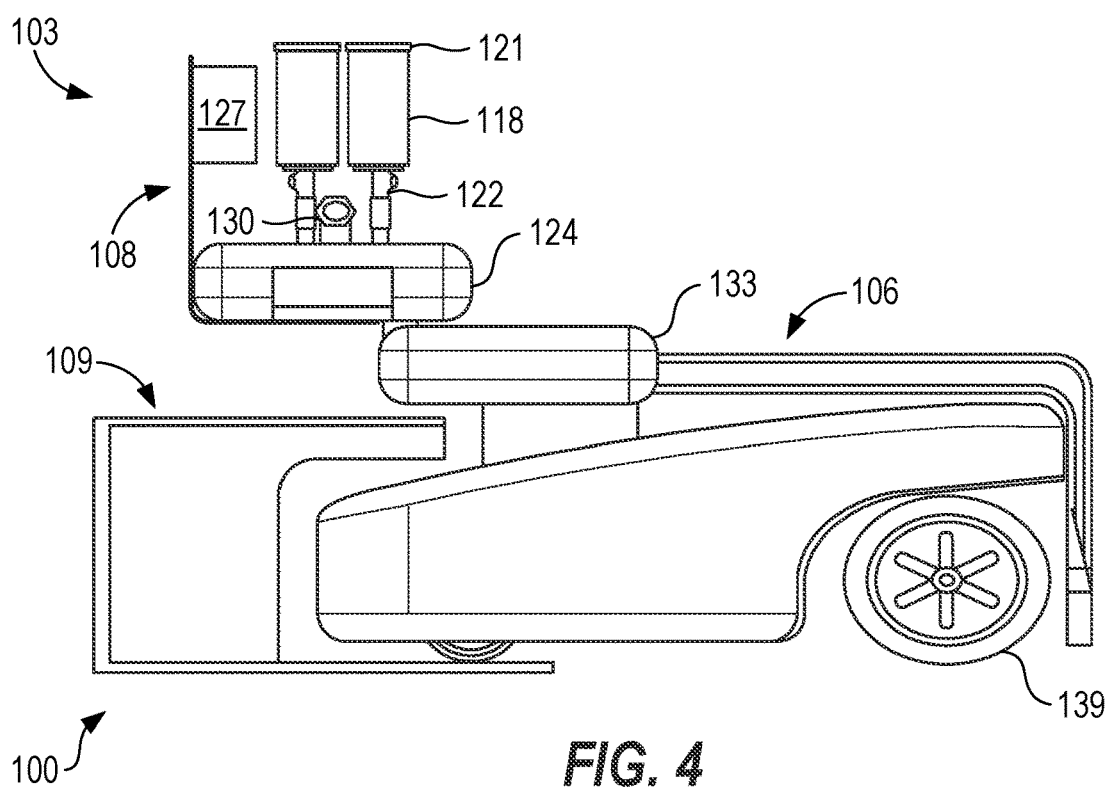
Figure 5:
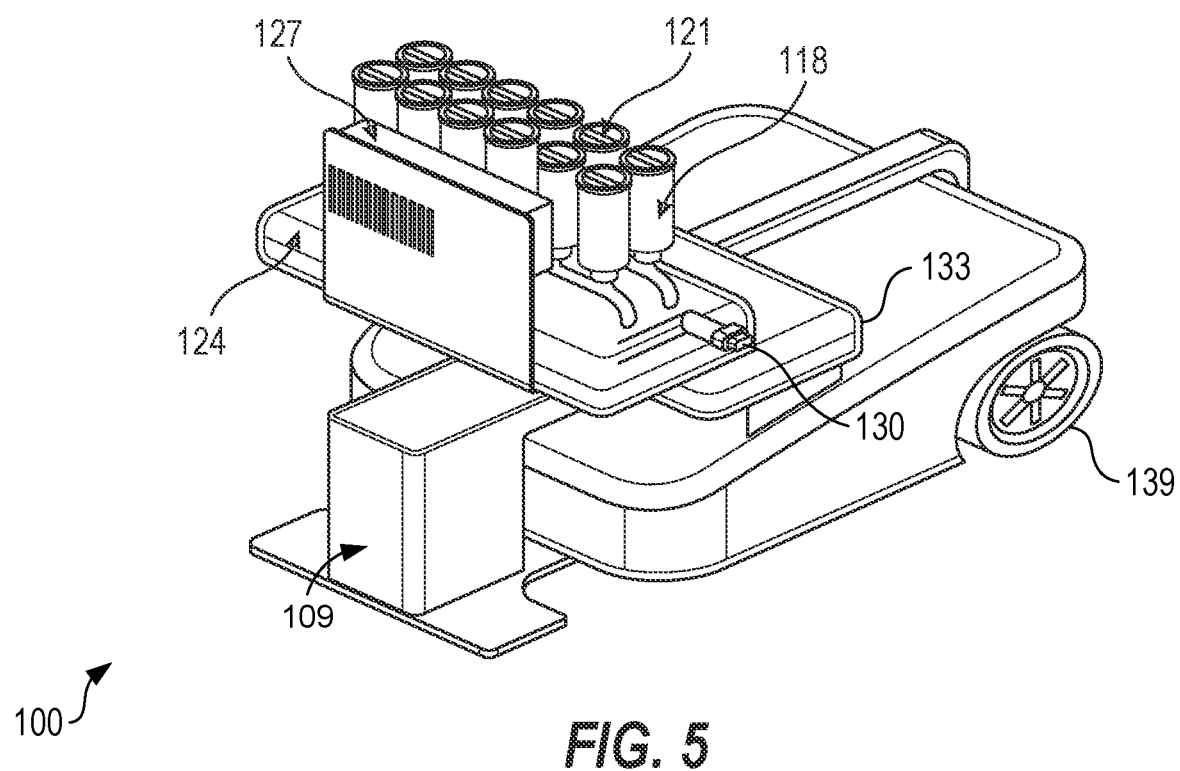

The example of FIG. 2 shows containers 121 in a two by six matrix of containers 121. However, other arrangements may be employed. In some embodiments, one or more of the containers 121 may include fertilizer, pre-emergent weed control, post-emergent selective weed control, insect and/or grub control, disease control fungicide, a combination thereof, growth inhibitor, growth promoter, or other desired additive. The fertilizer may include organic liquid lawn dressing, liquid slow release nitrogen, liquid dolemetic lime, a combination thereof, and/or other desired fertilizer.

The pre-emergent weed control may include, for example, dithiopyr, indaziflam, prodiamine, a combination thereof, and/or other desired pre-emergent weed control. The post-emergent selective weed control may include, for example, dicamba, dilethelimine, methylchlorophenoxypropionic acid (MCPP), glyphosate, carfentrazone-ethyl, mecoprop-P, dicamba, 2-4D, metsulfuron-methyl (e.g., 60% metsulfuron-methyl), or a combination thereof, and/or other post-emergent selective weed control.

The insect and/or grub control may include, for example, bifen, imidacloprid, a combination thereof, and/or other insect and/or grub control. The disease control fungicide may include, for example, thiphanate-methyl, propieonazole, imidacloprid, fluxastrobin, a combination thereof, and/or other disease control fungicide. As such, in various embodiments, the vehicle 106 may obtain measurements (e.g., via moisture sensors, imaging devices, cameras, etc.) from a lawn or other area to be treatment that may be communicated to the retrieval and charging station 103 which may be used to determine an optimal treatment for the lawn or other area. The optimal treatment may be converted to a mixing formula based on the contents of the retrieval and charging station 103 (e.g., the contents of the containers 121), and a treatment solution may be mixed and generated accordingly, which is diverted to the vehicle 106 to disperse in the lawn or other area.

The vehicle 106 may include a land-based vehicle in some embodiments. As such, the vehicle 106 may include wheels 136 (e.g., three wheels, four wheels, and so forth) sufficient for the vehicle 106 to navigate a lawn or other area. The vehicle 106 may include an applicator (e.g., a liquid sprayer, a powder shifter, and the like) that is configured to treat a lawn or the other area with the treatment solution, for example, as the vehicle 106 navigates the lawn or the other area.

In alternative embodiments, however, the vehicle 106 may include an aerial-based vehicle (e.g., an unmanned aerial vehicle). As such, the vehicle 106 may include rotors sufficient for the vehicle 106 to navigate a lawn or other area. Like the land-based vehicle 106, an aerial vehicle 106 may include an applicator (e.g., a liquid sprayer, a powder shifter, and the like) configured to treat a lawn or the other area with the treatment solution, for example, as the vehicle 106 navigates the lawn or the other area.

In some embodiments, the containers 121 may each container concentrated chemicals capable of being mixed and/or diluted in the mixing reservoir 124 having a water supply to form a specialty formula. The vehicle 106 may receive the specialty formula for dispersal. Various features of the vehicle 106 may enable the systematic treatment of various plants and/or areas of a law to reduce or eliminate the growth of unwanted plants while promoting the growth of desired plants. These may include the addition of imaging sensors and artificial intelligence to recognize unwanted plants versus desirable plants and develop ways to inhibit or grow each over a specified period. The system 100 thus enhances a homeowner's ability to consistently treat plants with low-volumes of chemical treatments, thereby limiting environmental effects and reducing chemical waste.

FIG. 6 shows another example of the vehicle 106 as a land-based vehicle having four wheels, for example, for navigating a lawn or other area. The vehicle 106 may include vehicle tubing 139 and a container 142. While the non-limiting example of FIG. 6 shows the container 142 positioned on a rear of the vehicle 106, in some embodiments, the container 142 may be positioned within a housing 145 of the vehicle 106 or at another location. Similarly, while the non-limiting example of FIG. 6 shows the vehicle tubing 139 on an outside of the housing of the vehicle 106, in alternative embodiments, the vehicle tubing 139 may be positioned within the housing.

The container 142 may include the vehicle reservoir 133 as well as the processing circuitry 148 of the vehicle 106. The processing circuitry 148 of the vehicle 106 may oversee or direct navigation of the vehicle 106 and/or the dispersal of treatment solution housed in the vehicle reservoir 133. In addition, in embodiments in which the vehicle 106 has a mower function (e.g., a blade that rotates to cut grass and other plants), the processing circuitry 148 may direct the vehicle 106 to selectively navigate, mow, and/or disperse the treatment solution.

The vehicle 106 may include a solution inlet 152 that receives treatment solution from the retrieval and charging station 103. In some embodiments, the solution inlet 152 includes an inlet funnel that makes it easier for the vehicle 106 to align with the retrieval and charging station 103 to refill the vehicle reservoir 133. In some embodiments, a pump and a motor may be disposed within the container 142 or the housing of the vehicle 106 that pumps solution or other contents from the solution inlet 152 to the vehicle reservoir 133.

Turning now to FIGS. 7 and 8, FIG. 7 shows another example of the solution retrieval portion 108 shown relative to a vehicle 106, and FIG. 8 shows another example of the charging portion 109. In the example of FIG. 7, the solution retrieval portion 108 includes wheels 155 such that the solution retrieval portion 108 is mobile. The solution retrieval portion 108 may be positioned in a yard, garage, shed, or other environment that permits the vehicle 106 to return (sometimes autonomously) and refill the vehicle reservoir 133 with treatment solution. While some embodiments include the water inlet 130 positioned on a front or rear of the solution retrieval portion 108, FIG. 7 shows the water inlet 130 positioned on a front face of the solution retrieval portion 108.

Figure 1:
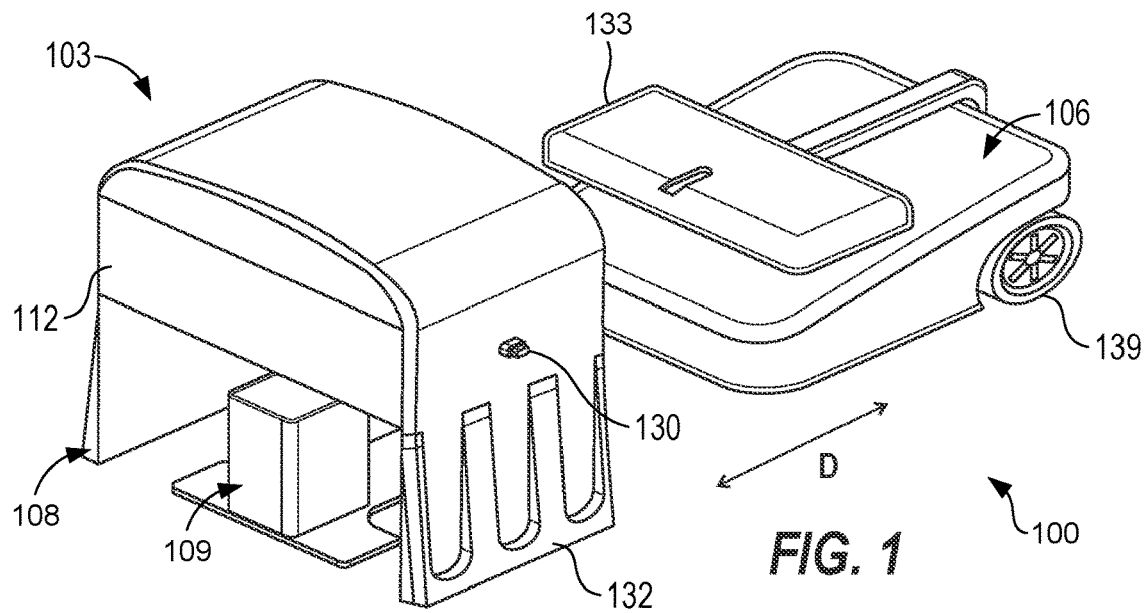
FIGS. 1-5 are examples of a system for automated lawn chemical treatment having a vehicle and a retrieval and charging station according to various embodiments.

The vehicle 106 may travel along a direction D to dock or otherwise engage with the charging portion 109 of FIG. 1 or 8, for example. The charging portion 109 of FIG. 8 includes an electrical contact positioned in a recess 158 that couples to a corresponding electrical contact of the vehicle 106 when docked (e.g., when a portion of the vehicle 106 is nested in the recess 158). Additionally, when the vehicle 106 docks with the charging portion 109, the solution inlet 152 of the vehicle 106 may connect and fluidly couple with a valve 161 of the charging portion 109. The valve 161 may be coupled to tubing (not shown) that, in turn, couples the valve 161 to the solution retrieval portion 108 and, more specifically, the mixing reservoir 124 of the solution retrieval portion 108.

When the vehicle 106 is nested in the recess 158 and an electrical charge process is initiated, the processing circuitry of the vehicle 106 may notify the processing circuitry of solution retrieval portion 108 of a presence of the vehicle (and/or amount of solution in the vehicle reservoir 133), which directs the processing circuitry of solution retrieval portion 108 to pump treatment solution to the vehicle 106, thereby filling the vehicle reservoir 133.

Figure 11:
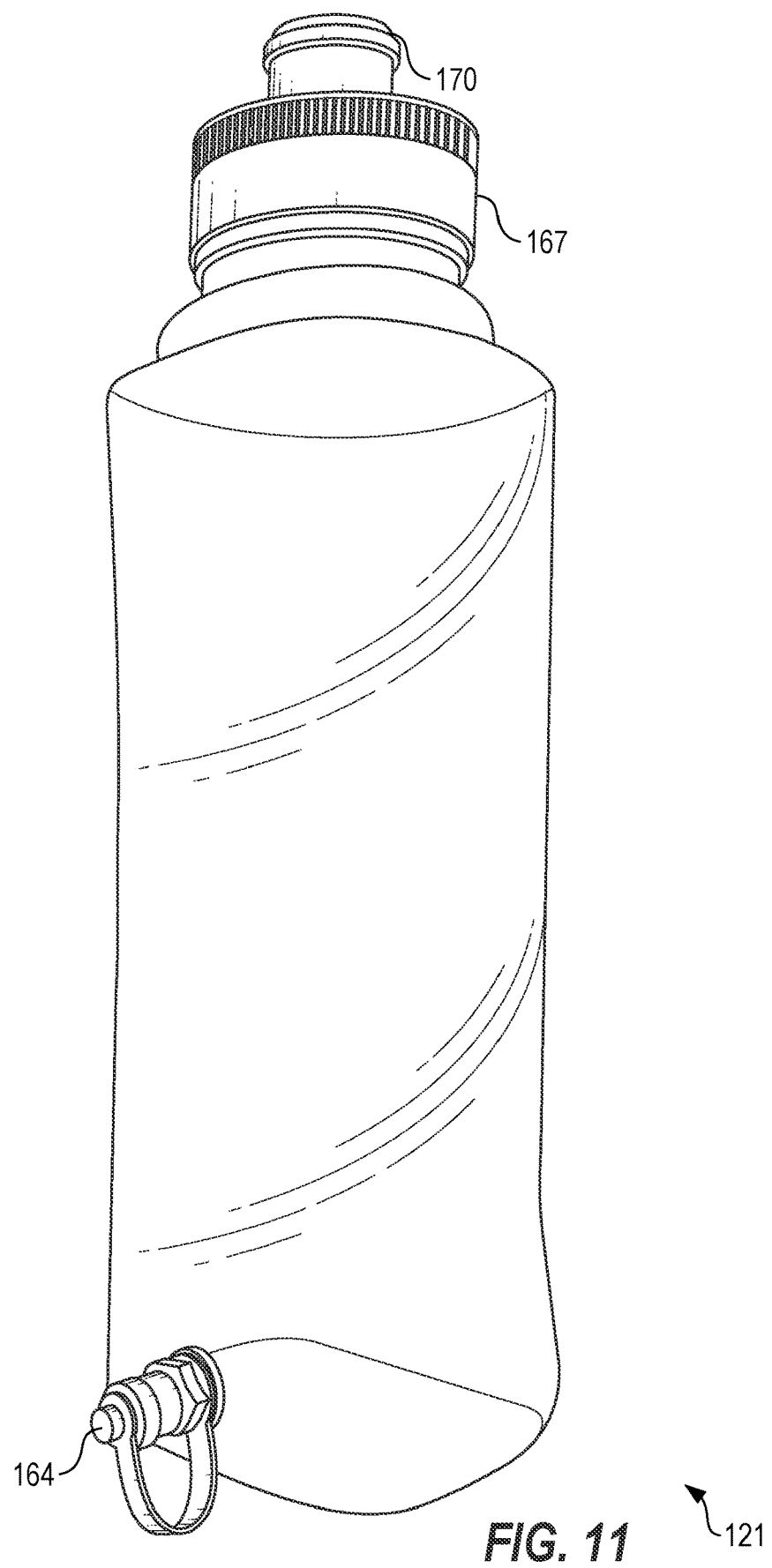
FIGS. 11 and 12 are examples of a container that may contain portions of a solution to be mixed and delivered to a vehicle according to various embodiments.
Figure 12:
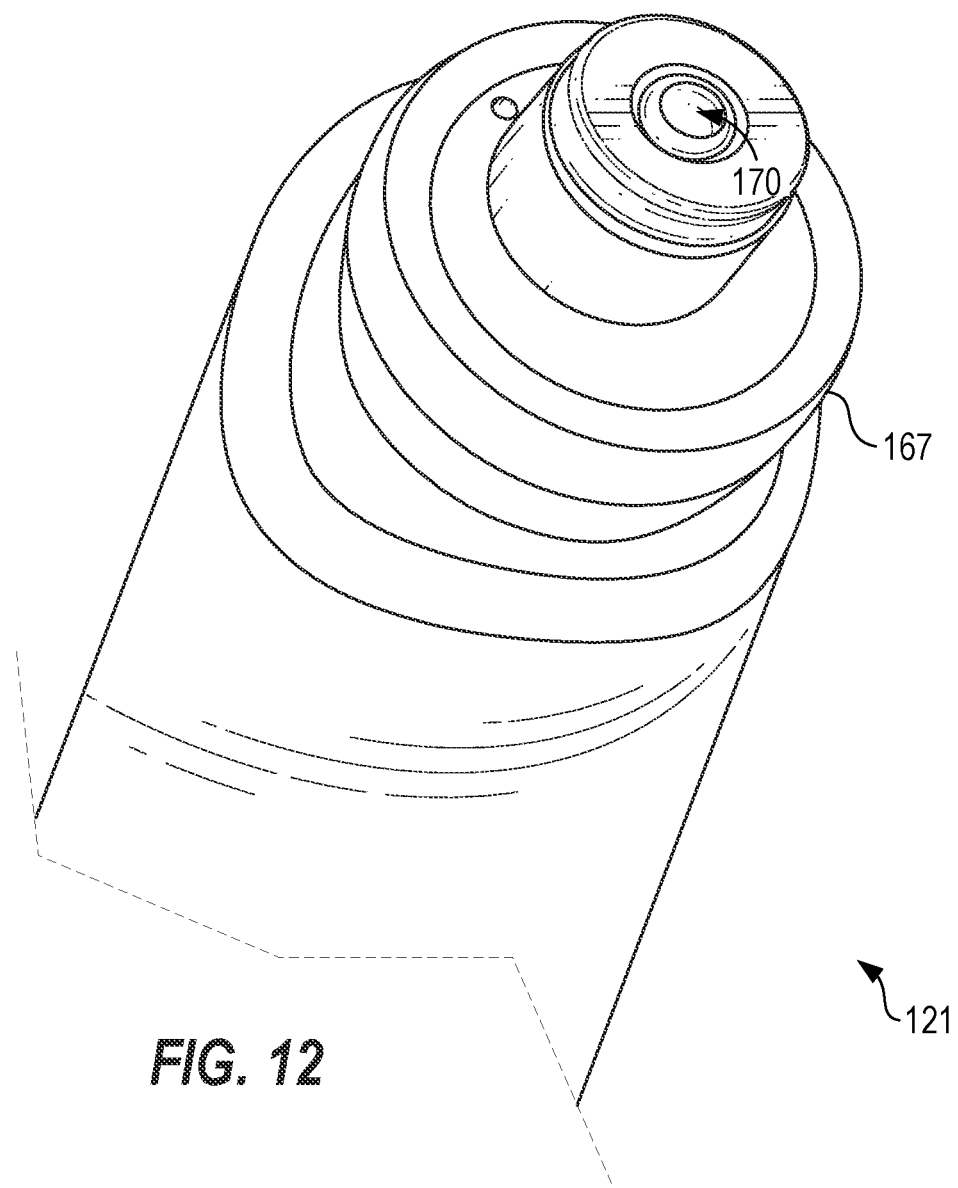

Moving along to FIGS. 9 and 10, various perspective views of the solution retrieval portion 108 are shown according to various embodiments. FIGS. 11 and 12 include various perspective views of the containers 121 that are able to be positioned in and removed from the solution retrieval portion 108. The containers 121 may include an air valve 164 that enables the solution contained therein to be gravity-fed to the tubing 122. Additionally, in some embodiments, the containers 121 may include lids 167 (e.g., removable lids 167) and a solution outlet 170. The containers 121 may form a snap connection or an interference fit with the container receptacles 118 or other desired component of the solution retrieval portion 108. As such, a technician or other individual can quickly swap low or empty containers 121 with full containers 121 during site visits.

A top view of processing circuitry 173 and a power supply 176 of the solution retrieval portion 108 is shown in FIG. 10, where the power supply 176 may be toggle via a power switch 179. While the processing circuitry 173 is shown as being exposed in FIG. 10, it is understood that the processing circuitry 173 may be enclosed in a waterproof or water-resistant container in some embodiments. In addition to the functionality of the processing circuitry 173 described above, in some embodiments, the processing circuitry 173 may cause a light-emitting diodes (LEDs) or other light emitting elements to illuminate based on a respective level of a container 121. For instance, as the containers 121 may be arranged in a two by six matrix, a two by six matrix of LEDs may be exposed on a front portion of the solution retrieval portion 108. The processing circuitry 173 may cause a respective LED to illuminate red when a corresponding one of the containers 121 is empty, yellow when a corresponding one of the containers 121 is low, and green when a corresponding one of the containers 121 is full or near full. The containers 121 may be formed of plastic, recycled plastic, or a biodegradable material.

Figure 13:
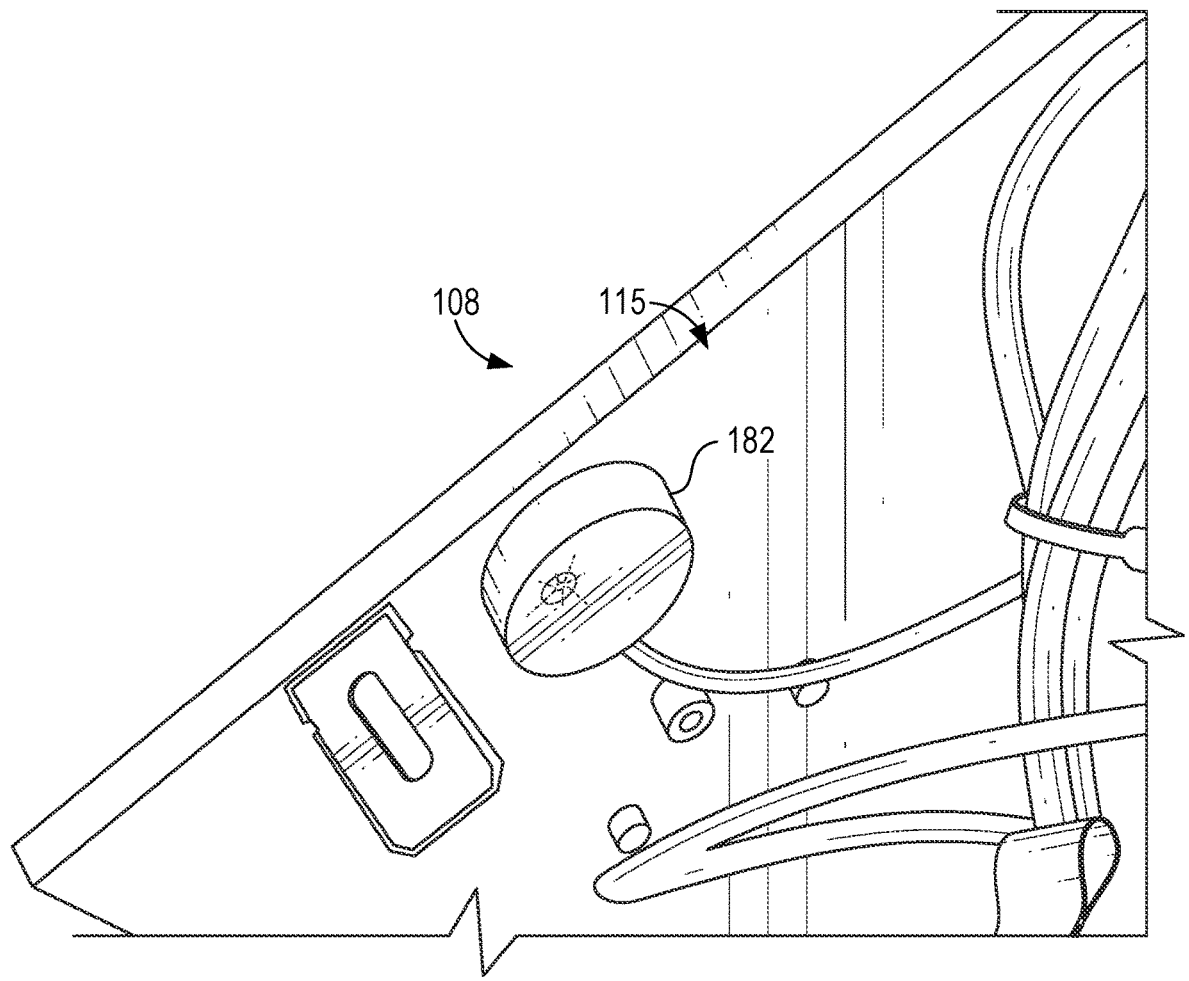
FIG. 13 is an example of a sensor according to various embodiments.

In various embodiments, the solution level of a respective one of the containers 121 may be determined based on a flow rate of solution from the containers 121 measured via a flow rate sensor. In some embodiments, the solution level of a respective one of the containers 121 may be determined based on an optical sensor that detects the presence of (or lack of) solution at particular areas of the container 121. In various embodiments, the solution level of a respective one of the containers 121 may be determined based on a non-contact liquid level sensor 182, shown in FIG. 13 that utilizes signal processing technology to achieve non-contact liquid level detection, such as the XKC-Y25-T12V SKU SEN0204 sensor by DFROBOT®.

Figure 14:
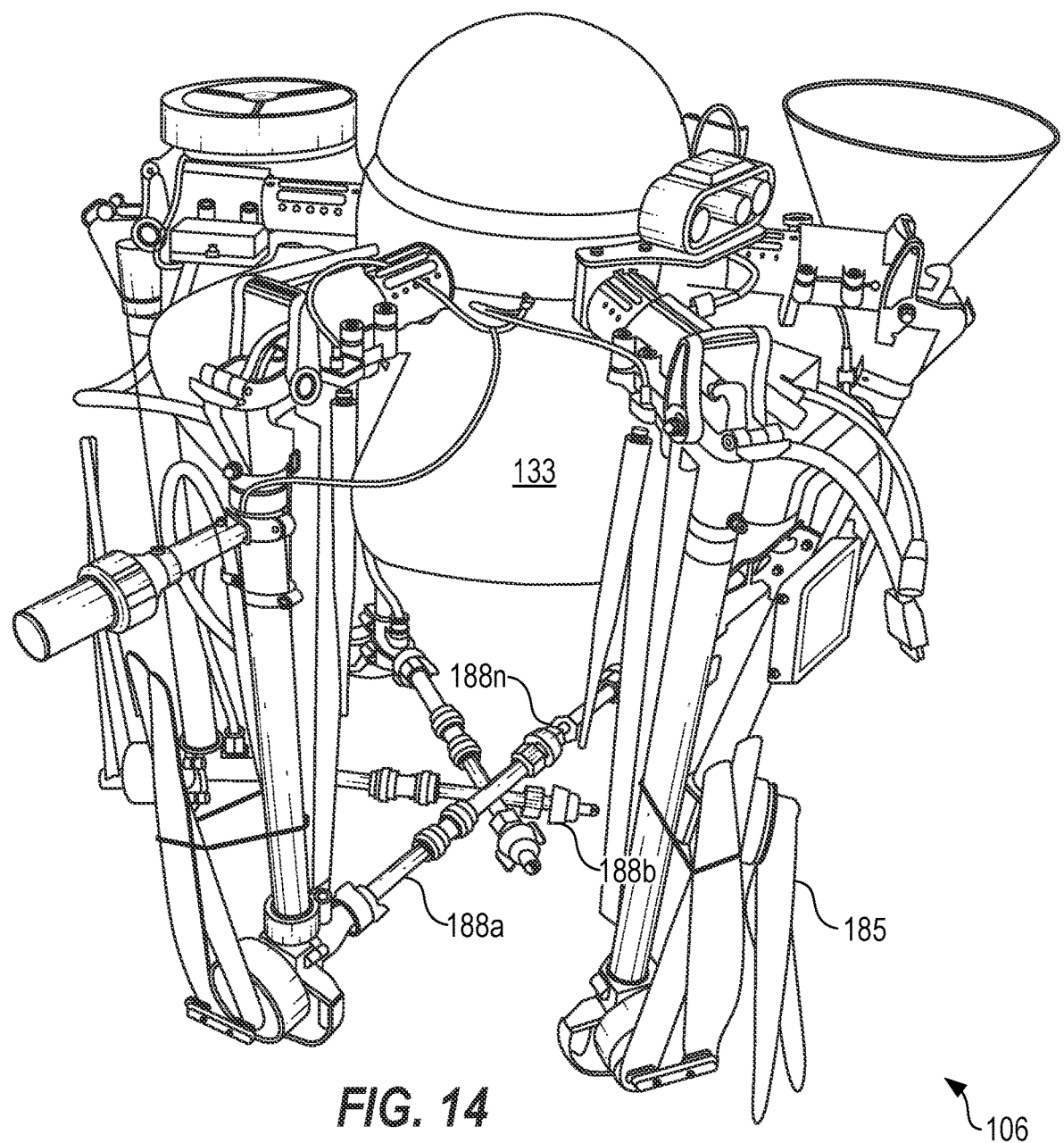
FIG. 14 is an example of an aerial-based vehicle that may be used with the system of FIGS. 1-10 or in place of a land-based vehicle thereof according to various embodiments.

Moving along to FIG. 14, a non-limiting example of a vehicle 106 is shown according to various embodiments. As noted above, in combination with or in place of a land-based vehicle 106 (shown in FIG. 1, for example), the vehicle 106 may include an aerial-based vehicle (e.g., an unmanned aerial vehicle). The vehicle 106 may include rotors 185 sufficient for the vehicle 106 to fly above and navigate a lawn or other area. The rotors 185 of the vehicle 106 of FIG. 14 are shown in a folded non-use state, as may be appreciated. Like the land-based vehicle 106, the aerial vehicle 106 may include one or more applicators 188a . . . 188n (e.g., a liquid sprayer, a powder shifter, and the like) configured to treat a lawn or the other area with the treatment solution from the vehicle reservoir 133, for example, as the vehicle 106 navigates the lawn or the other area. The applicators 188 may form or be part of legs of the vehicle 106, as shown in FIG. 14.

To fill the vehicle reservoir 133, the vehicle 106 may include a funnel which may engage with a part of the retrieval and charging station 103. For instance, the retrieval and charging station 103 may include a flat landing surface (e.g., a top of the lid 117) on which the vehicle 106 can land. Upon landing, a charging and refilling process may be initiated similar to that of the land-based vehicle 106.

Figure 15:
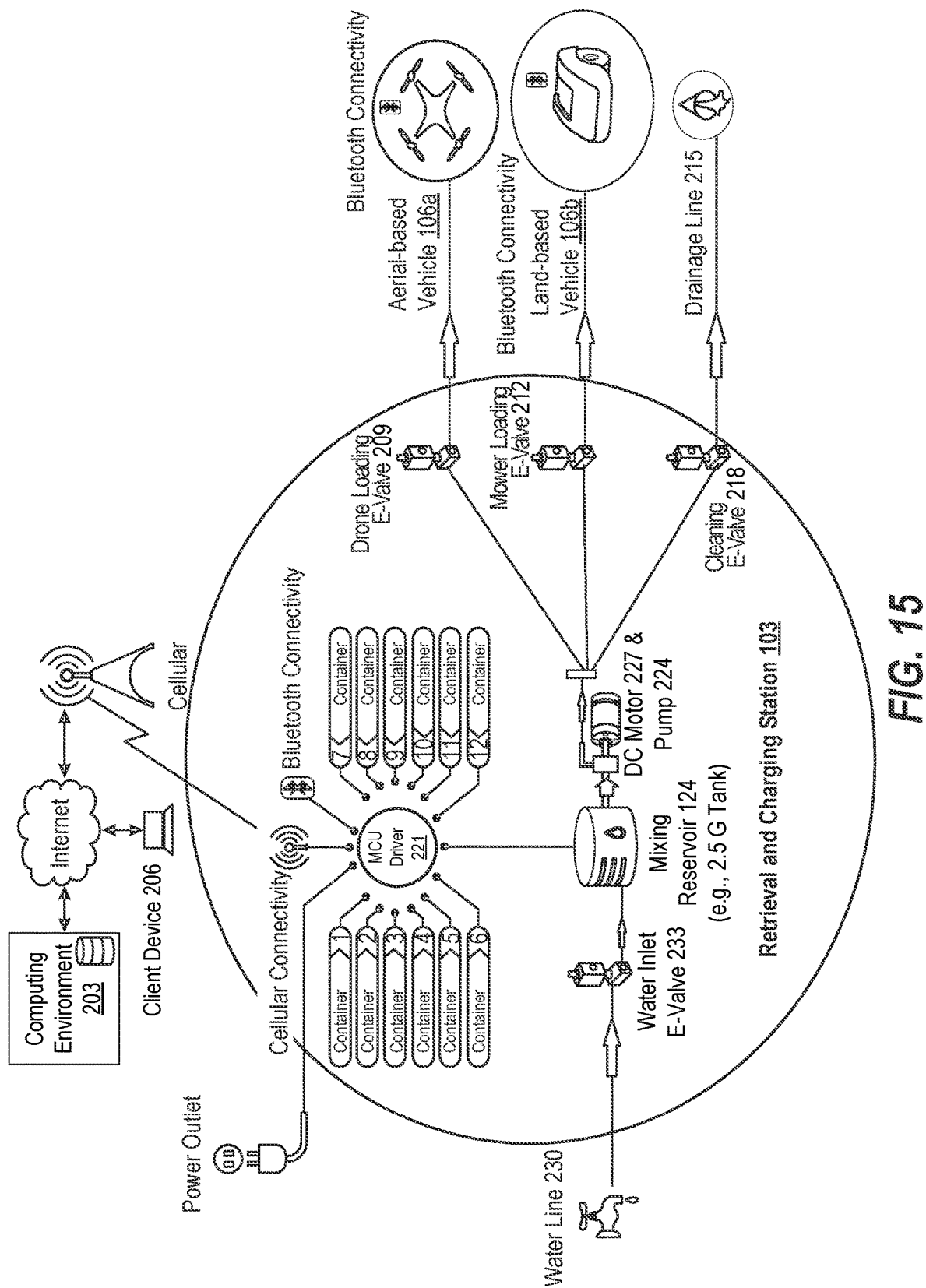
FIG. 15 is a networked environment showing the system for automated lawn chemical treatment according to various embodiments.

Referring now to FIG. 15, an example of a networked environment 200 is shown according to various embodiments. The networked environment 200 includes one or more vehicles 106 (e.g., a land-based vehicle 106b, such as a mower, or an aerial-based vehicle 106a, such as a UAV) and one or more retrieval and charging stations 103 in connection with a computing environment 203 over a network. The networked environment may further include a client device 206, such as a mobile phone, a smartphone, a tablet, a laptop, or other computing device. An aerial-based vehicle, such as a UAV, may dock or otherwise engage with a drone loading e-valve 209, which may be positioned on a top of the retrieval and charging station 103, for example, whereas a land-based vehicle 106, such as a mower, may dock or otherwise engaged with a mower loading e-valve 212.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource, and/or any other distributed computing arrangement.

The vehicles 106 are representative of a plurality of vehicles 106 that may be coupled to the network. The vehicles 106 and/or the retrieval and charging stations 103 may include processing circuitry that may include, for example, a processor-based system. To this end, various operations of the vehicle 106 and/or the retrieval and charging stations 103 described herein may be embodied in software or code executed by general purpose hardware. As an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), other components, etc. Such technologies are generally well known by those skilled in the art and, consequently, are not described in detail herein In some embodiments, the retrieval and charging station 103 may be able to accommodate only one of an aerial-based vehicle 106a or a land-based vehicle 106b. Alternatively, in some embodiments, the retrieval and charging station 103 may be able to accommodate both the aerial-based vehicle 106a and the land-based vehicle 106b. A drainage line 215 may be fluidly coupled to a cleaning e-valve 218, for instance, to flush the retrieval and charging station 103 or, more specifically, the tubing and/or the mixing reservoir 124.

In some embodiments, the processing circuitry 173 of the retrieval and charging station 103 may include a microcontroller unit (MCU) driver 221 that provides services for microcontroller initialization, power down functionality, reset, and/or microcontroller specific functions required by microcontroller abstraction layer (MCAL) software. The MCU driver 221 may direct a pump 224 via a motor 227 (e.g., a DC motor) to access contents of the containers 121, which may be in liquid form for example. The embodiments described herein are not limited to liquid form, and powders and other solids may be employed. Further, the MCU driver 221 may pump or otherwise direct water from a water line 230 to the mixing reservoir 124 via a water inlet e-valve 233. The e-valves discussed herein, such as the drone loading e-valve 209, the mower loading e-valve 212, the cleaning e-valve 218, and the water inlet e-valve 233, may include electronic valves that can be controlled via an electronic signal, such as a 5V signal, that directs the valve to open, close, or partially open or close.

In some embodiments, the retrieval and charging station 103 has cellular connectivity and, as such, communicates over a telephony network using a subscriber identification module (SIM) card. The SIM card may be associated with an end user or an account provider, such as a lawn service provider. The MCU driver 221 may include Bluetooth® connectivity, or other short-range communication medium, such as Wi-Fi®, Zigbee®, Wi-Fi HaLow/IEEE® 802.11ah, Z-wave®, or other suitable communication medium.

Figure 16:
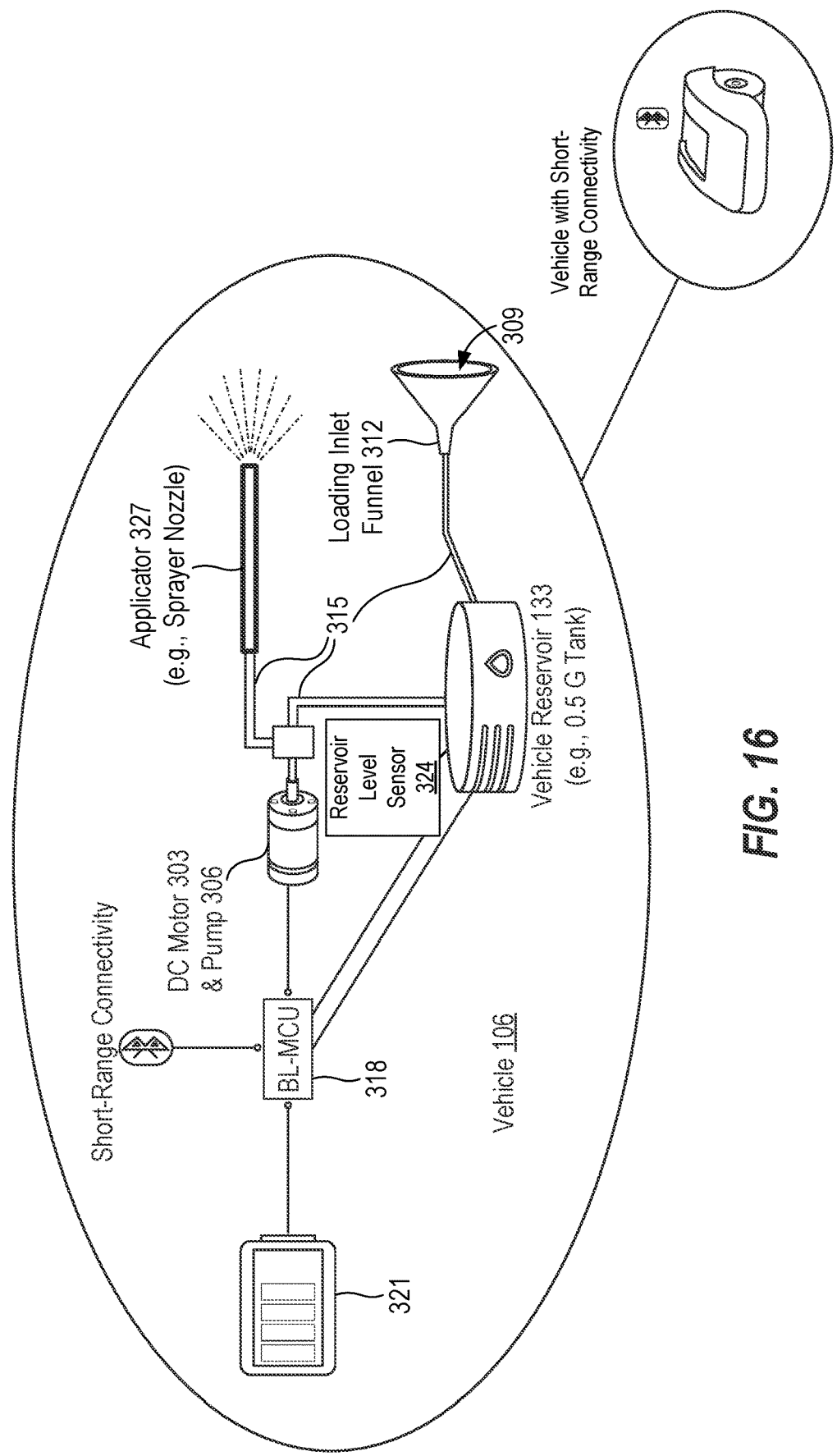
FIG. 16 is a schematic diagram showing the vehicle of the system for automated lawn chemical treatment according to various embodiments.

Moving along to FIG. 16, a schematic diagram of the vehicle 106 is shown according to various embodiments. In various embodiments, the vehicle 106 may include a motor 303 (e.g., a DC or AC motor), a pump 306, a vehicle reservoir 133, a solutions inlet 309, a loading inlet funnel 312, tubing 315, a networking module 318, a battery 321, a reservoir level sensor 324, and/or an applicator 327. As noted above, the networking module 318 may include a Bluetooth® module configured to communicate with processing circuitry of the retrieval and charging station 103, for instance, to notify the retrieval and charging station 103 of the presence of the vehicle 106 (e.g., when in a docked state) as well as to notify an amount of solution or other content in the vehicle reservoir 133. The applicator 327 may include a sprayer nozzle or like device, for instance, when the contents to be dispersed include liquid solutions.

Figure 17:
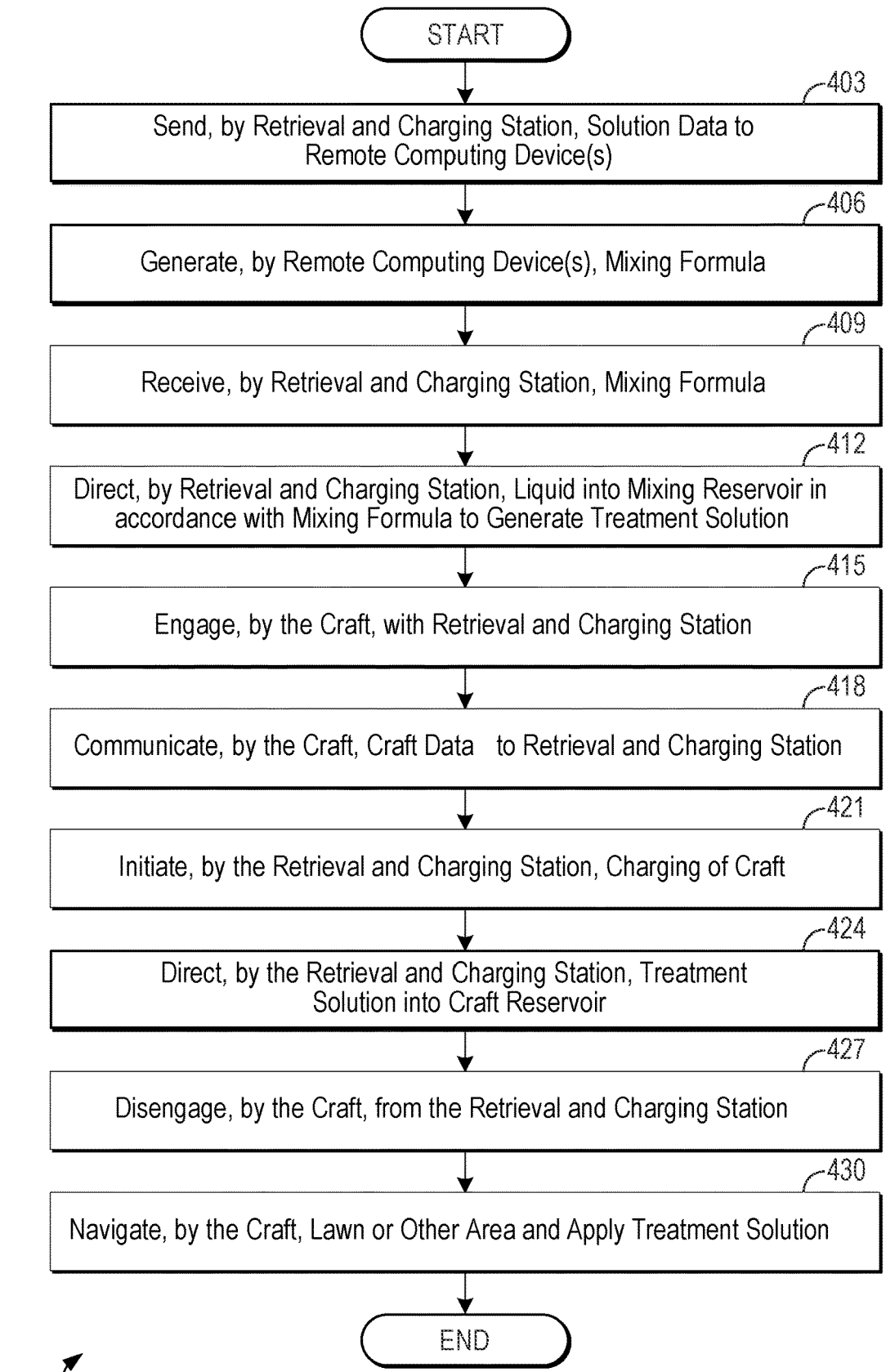
FIGS. 17-19 are flowcharts showing example operations of the system for automated lawn chemical treatment according to various embodiments.

Referring next to FIG. 17, a flowchart 400 is shown that provides one example of the operation of a portion of the components of the system 100 according to various embodiments. It is understood that the flowchart 400 of FIG. 17 provides merely an example of the many different types of functional arrangements that may be employed to implement the operation of the portion of the retrieval and charging station 103, the vehicle 106, and/or the computing environment 203 as described herein.

Beginning with box 403, the retrieval and charging station 103 may send solution data and/or environmental data to a remote computing device, such as the computing environment 203 of FIG. 15. As noted above, the computing environment 203 may include, for example, a server or collection of server computing devices. The solution data to the computing environment 203 or other computing device may include, for example, a list of the containers 121 (or a list of identifiers of the containers 121) positioned in the retrieval and charging station 103 as well as corresponding solution amounts or solution levels. The environmental data may include information associated with a lawn or area to be treated, such as images of the lawn or area to be treated captured using a camera onboard the vehicle 106, as well as other data. The environmental data may include a geographic location (e.g., global positioning system (GPS) coordinates) of the retrieval and charging station 103. It is understood that the vehicle 106 may include additional sensors, such as soil moisture level sensors and the like, to measure and send environmental data to the remote computing device(s).

Next, at box 406, the computing environment 203, may generate a mixing formula. The mixing formula may be generated as a function of the containers 121 positioned in containers 121 positioned in the retrieval and charging station 103 as well as corresponding solution amounts or solution levels and environmental data, if available. In other words, the mixing formula is generated as an optimal treatment based on the solutions readily available in the retrieval and charging station 103 and/or the environmental data. It is understood that a particular application for a homeowner in an arid area may be drastically different than an application for a homeowner in a humid or wet area. In some embodiments, the mixing formula is generating using a machine learning routine, where the machine learning routine may include one of a convolutional neural network (CNN) or other suitable machine learning routine.

At box 409, the retrieval and charging station 103 may receive the mixing formula from the computing environment 203, for instance, over a network, such as a cellular network and/or the Internet. At box 412, the processing circuitry 173 of the retrieval and charging station 103 may flush contents of the mixing reservoir 124 and, thereafter, direct liquid into the mixing reservoir 124 in accordance with the mixing formula received in box 409. It is understood that the mixing formula may include a list of solutions, corresponding containers 121 including the solutions, and an amount (e.g., milliliters) to obtain from each container 121 and/or water from the water line 230. In some embodiments, the solution is accessed from each of the containers 121 at a rate that causes agitation in the mixing reservoir 124 such that the contents of the mixing reservoir 124 are mixed.

At box 415, the vehicle 106 may dock or otherwise engage with the retrieval and charging station 103. For instance, the vehicle 106 may physically couple to one or both of the solution retrieval portion 108 and a charging portion 109. In some embodiments, the vehicle 106 executes a docking routine that navigates and directs the vehicle 106 to physically couple to one or both of the solution retrieval portion 108 and a charging portion 109 (e.g., along direction D shown in FIG. 1).

Thereafter, at box 415, the processing circuitry 148 of the vehicle 106 may communicate vehicle data to the retrieval and charging station 103, for instance, using Bluetooth® or other near-range communication medium. In some embodiments, the vehicle data includes a battery level, an amount of solution residing in the vehicle reservoir 133, and/or other information. The amount of solution residing in the vehicle reservoir 133 may be identified by a non-contact liquid level sensor located in the vehicle 106, as may be appreciated.

At box 421, the processing circuitry 173 of the retrieval and charging station 103 may initiate a charging of the vehicle 106, if not performed automatically. Next, at box 424, the processing circuitry 173 of the retrieval and charging station 103 may direct treatment solution from the mixing reservoir 124 to the vehicle reservoir 133, for instance, by controlling the motor 227 and the pump 224. It is understood that the treatment solution is diverted to the vehicle 106 using the solution inlet 309 and/or the loading inlet funnel 312, shown in FIG. 16.

At box 427, the vehicle 106 may disengage or otherwise physically separate from the retrieval and charging station 103. Thereafter, at box 430, the vehicle 106 may navigate a lawn or other area and disperse the treatment solution contained in the vehicle reservoir 133 using an applicator 327, such as a sprayer nozzle. Thereafter, the process may restart or proceed to completion.

Figure 18:
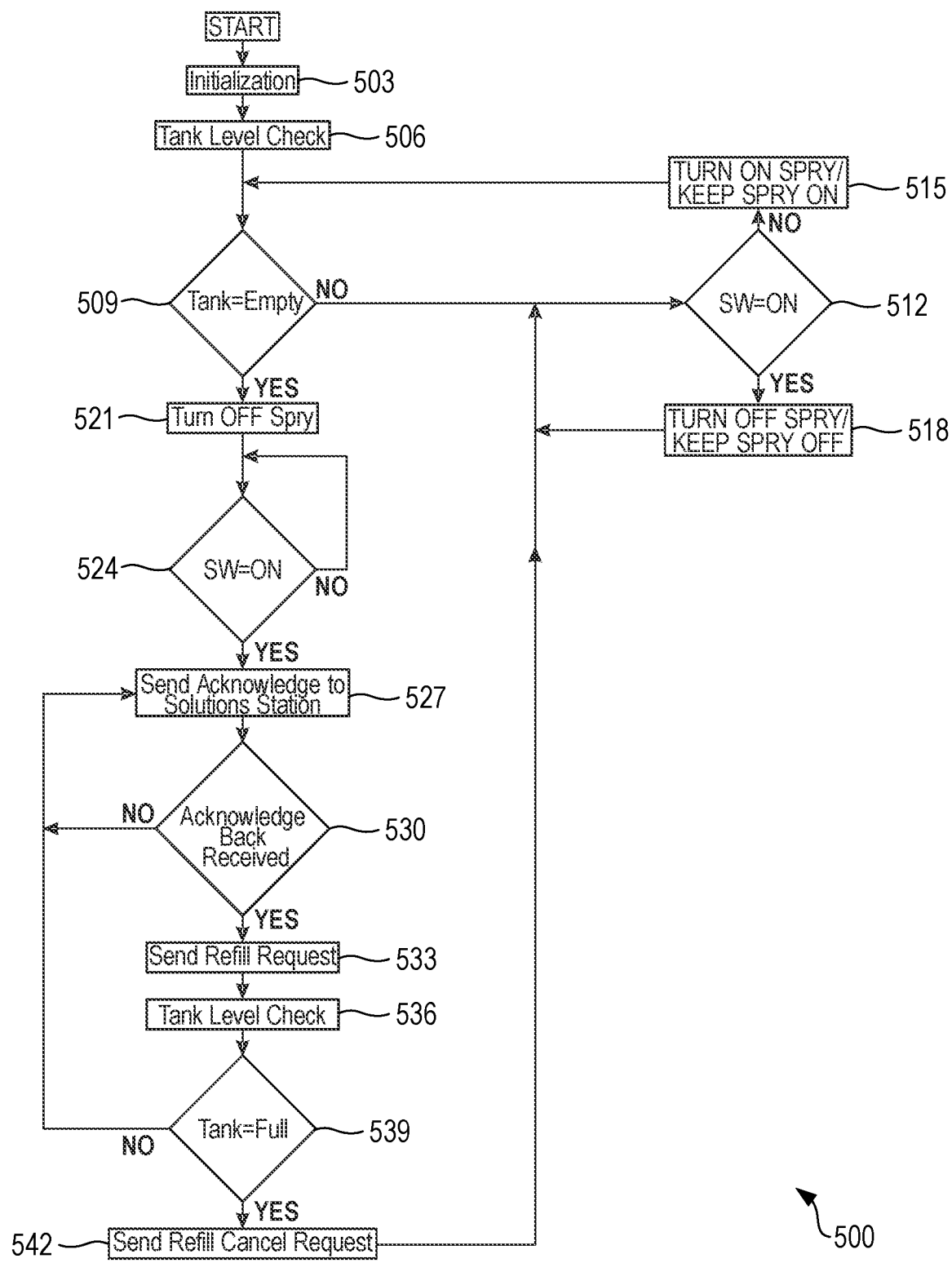

Referring next to FIG. 18, a flowchart 500 is shown that provides one example of the operation of a portion of the components of the system 100 according to various embodiments. It is understood that the flowchart 500 of FIG. 18 provides merely an example of the many different types of functional arrangements that may be employed to implement the operation of the portion of the vehicle 106 or the processing circuitry 148 of the vehicle 106 as described herein.

Beginning with box 503, the processing circuitry 148 of the vehicle 106 may perform an initialization. Next, at box 506, the processing circuitry 148 of the vehicle 106 may perform a tank level check or, in other words, may determine a level of solution in the vehicle reservoir 133. The process then proceeds to box 509 where the processing circuitry 148 of the vehicle 106 may determine whether the vehicle reservoir 133 is empty. If the vehicle reservoir 133 is not empty, the process may proceed to box 512. At box 512, a determination is made whether the sprayer or other applicator 327 is on. If the sprayer is on, the process proceeds to box 518. At box 518, the processing circuitry 148 of the vehicle 106 may turn off the sprayer or keep the sprayer off. Referring back to box 512, if the sprayer is not on, the process may proceed to box 515 where the sprayer is turned on or kept on. Thereafter, the process reverts back to box 509.

Referring again to box 509, if the vehicle reservoir 133 is empty, the process may proceed to box 521 where the sprayer is turned off. Thereafter, the process may proceed to box 524 where or where a determination is made whether the sprayer is still on. If the sprayer is not on, the process may revert back to 521. If the sprayer is on, the process proceeds to box 527 where the processing circuitry 148 of the vehicle 106 sends an acknowledgment to the retrieval and charging station 103.

Thereafter, the process proceeds to box 530 where an acknowledgment from the retrieval and charging station 103 is received. Next, the process proceeds to box 533 to send a refill request to the retrieval and charging station 103. At box 536 the processing circuitry 148 of the vehicle 106 may perform a vehicle reservoir 133 level check. At box 539, the processing circuitry 148 of the vehicle 106 may determine whether the vehicle reservoir 133 is full. If the vehicle reservoir 133 is full, the process may proceed to box 542 where the processing circuitry 148 of the vehicle 106 may send a refill cancel request to the retrieval and charging station 103. Thereafter, the process may proceed to completion.

Figure 19:
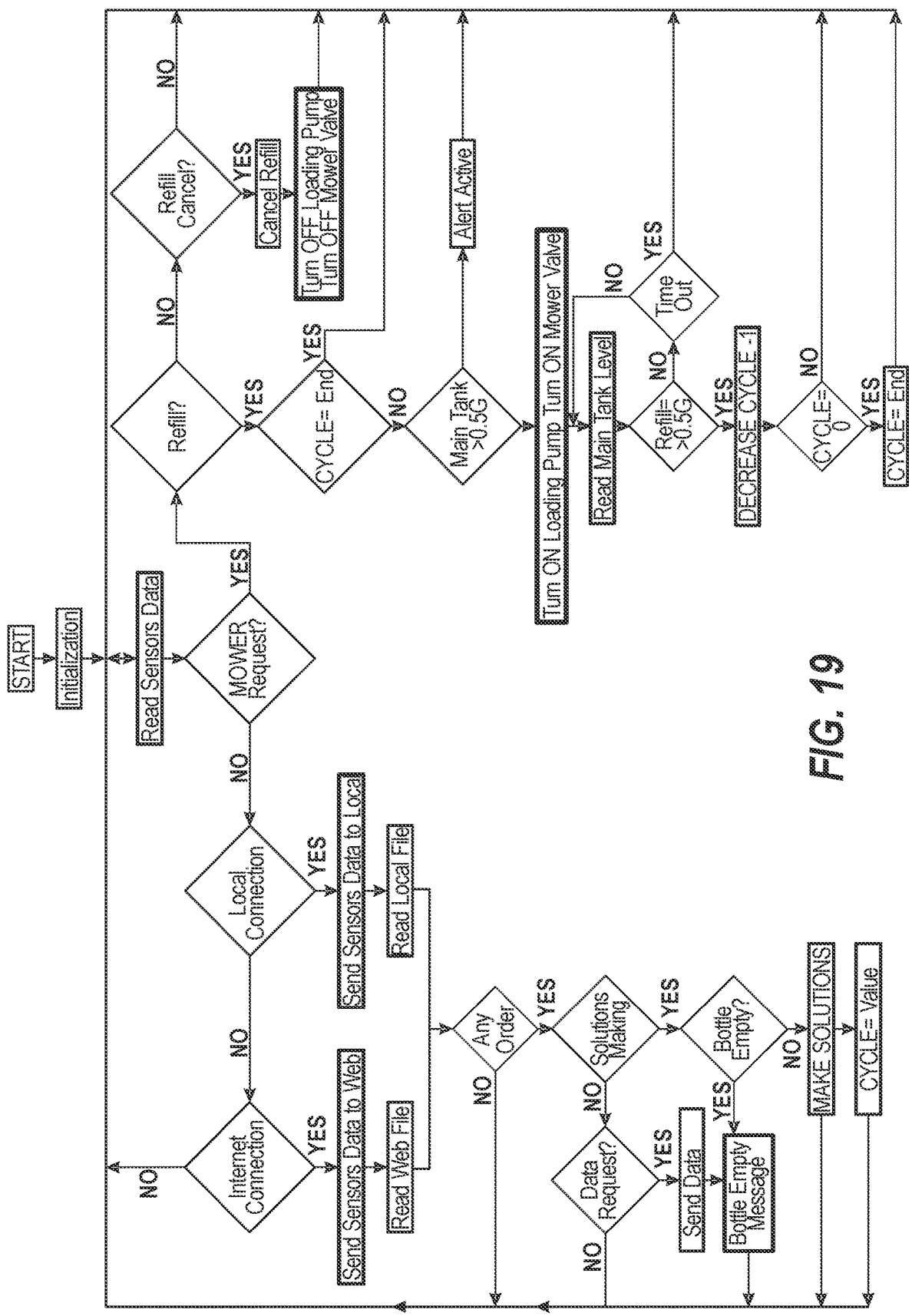

Referring next to FIG. 19, a flowchart 600 is shown that provides one example of the operation of a portion of the components of the system 100 according to various embodiments. It is understood that the flowchart 600 of FIG. 19 provides merely an example of the many different types of functional arrangements that may be employed to implement the operation of the portion of the retrieval and charging station 103 or the processing circuitry 173 of the retrieval and charging station 103 as described herein.

First, the processing circuitry 173 of the retrieval and charging station 103 may perform an initialization. The initialization may include initializing the sensors and/or reading sensor data of the retrieval and charging station 103, as may be appreciated. Next, the processing circuitry 173 of the retrieval and charging station 103 may read sensor data from the sensors therein. Next, a determination may be made whether a vehicle 106 (e.g., a "mower" or land-based vehicle 106) has sent a request to the retrieval and charging station 103.

If the vehicle 106 has cent a request, a determination nay be made whether a refill has been requested by the vehicle 106. If a refill has been requested by the vehicle 106, the process may proceed to determine whether there is an end of cycle and, thereafter, whether the vehicle reservoir 133 of the vehicle 106 is greater than half a gallon. Then, the motor 227 and/or the pump 224 may be turned on turned on along with the mower loading e-valve 212. Then, the level of the vehicle reservoir 133 may be read and a determination may be made whether the vehicle reservoir 133 of the vehicle 106 has exceeded half a gallon. If so, the cycle may be decreased by one metric or other suitable value. Thereafter, the cycle may proceed to completion.

Referring back to the mower request determination, if a request has not been received from the vehicle 106, the process may proceed to determine whether a local connection has been made. If so, sensor data is sent to local memory and a read of a local file is performed. If an Internet connection is available, the sensor data may be sent to the computing environment 203 and a file in the computing environment 203 corresponding to the particular retrieval and charging station 103 may be read. The file may include a mixing formula, software updates, or other data, as may be appreciated. If an order is received from the computing environment 203, a determination is made whether the order includes a solution making order or a data request. If a solution making order is made, a determination may be made whether a container 121 residing in the retrieval and charging station 103 is empty. If the container 121 is not empty, a solution may be made in the mixing reservoir 124. Thereafter, the process may proceed to completion. If a data request has been received from the computing environment 203, the processing circuitry 173 of the retrieval and charging station 103 may send the data to the computing environment 203 and send an empty-bottle notification (e.g., notifying a service team that a container replacement should be performed), if applicable. Thereafter, the process proceeds to completion.

Figure 20:
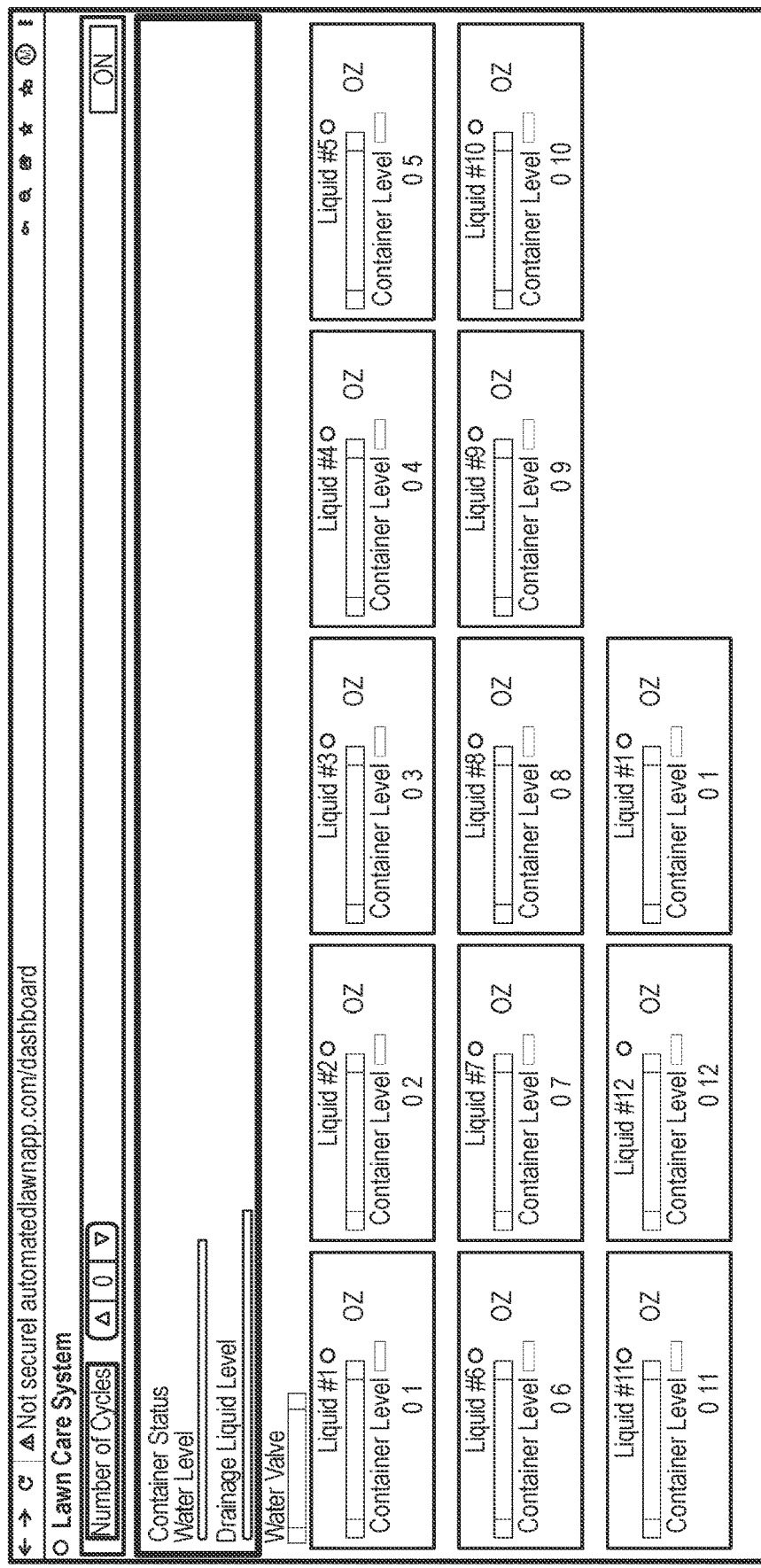
FIG. 20 is a graphical user interface that may be rendered in a display in association with a use of the system for automated lawn chemical treatment according to various embodiments.

Moving along, FIG. 20 depicts an example of a user interface 603 that may be rendered in a display of a client device 206. More specifically, the user interface 603 may be accessed by a service technician or an end customer. The user interface 603 may display data associated with containers 121 residing in a respective retrieval and charging station 103. For instance, the user interface 603 may include a list of each container 121 residing in the retrieval and charging station 103 as well as a corresponding solution level determined using sensor data. As such, a service technician or an end user may be able to quickly determine which containers 121 should be replaced and which containers have sufficient solution levels for future treatments. In additional embodiments, the service technician or the end user may customize the mixing formula or tweak a suggested mixing formula generated by the computing environment 203. Accordingly, a subsequent dispersal of a treatment solution can be customized by the service technician or the end user.

Figure 21:
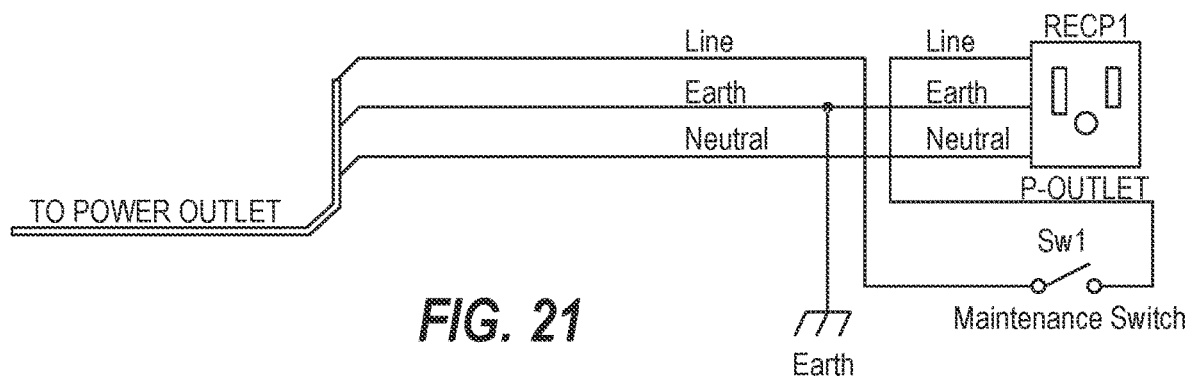
FIGS. 21-24 are example circuit diagrams for circuits that are employed in the system for automated lawn chemical treatment according to various embodiments.
Figure 22:
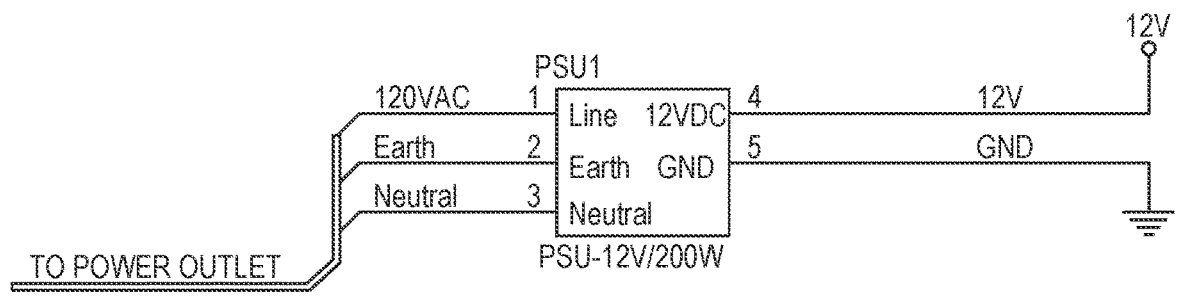
Figure 23:
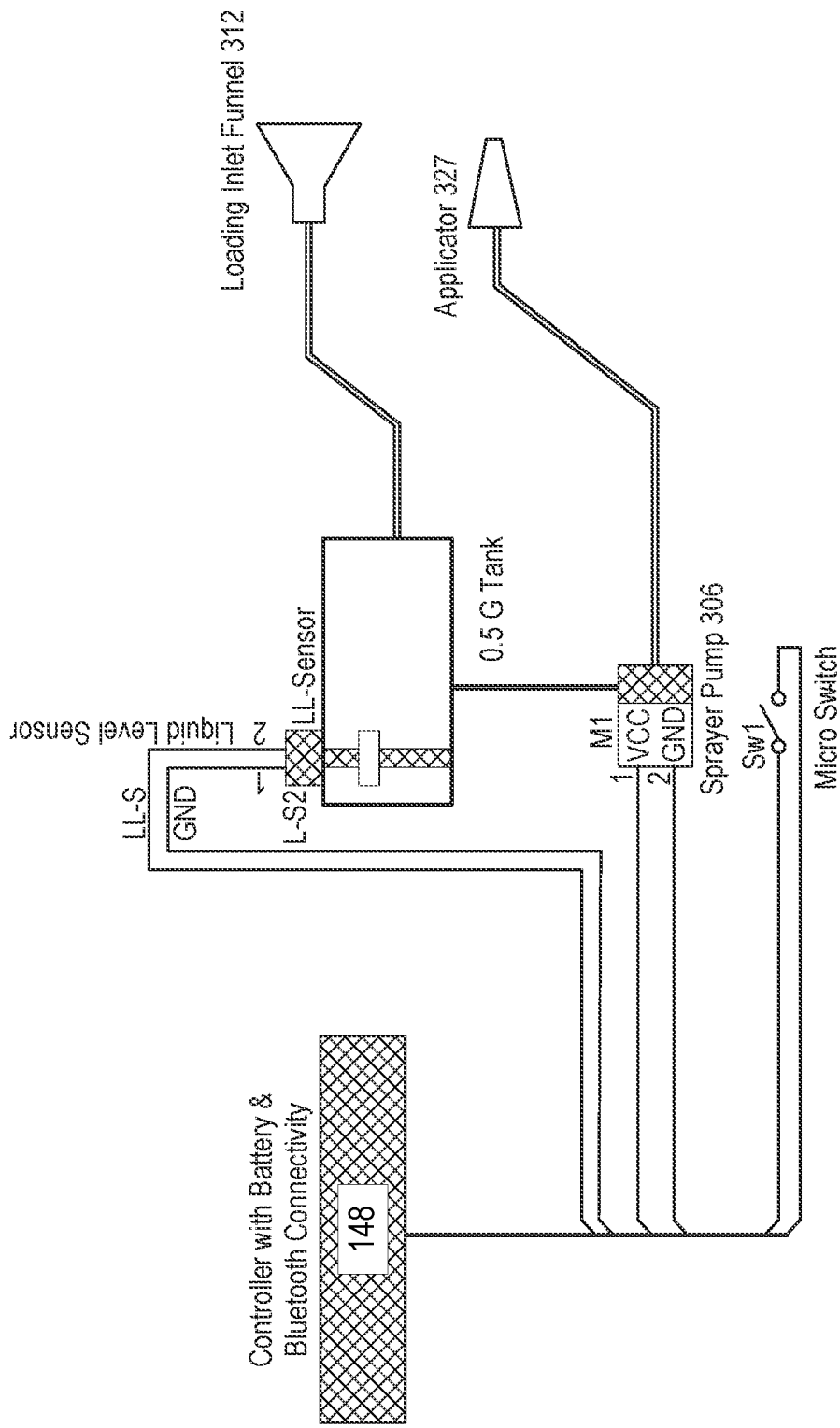

FIG. 21 shows an example of a circuit for implementing a 120 V switch to a standard power outlet for the retrieval and charging station 103, whereas FIG. 22 shows an example of a circuit for a power supply of the retrieval and charging station 103. FIG. 23 shows an example of a circuit implemented in the vehicle 106 to implement near-field communication (e.g., Bluetooth® communication) with the retrieval and charging station 103, to retrieve solution from the retrieval and charging station 103, and to disperse solution via an applicator 327 (e.g., sprayer nozzle).

Figure 24:
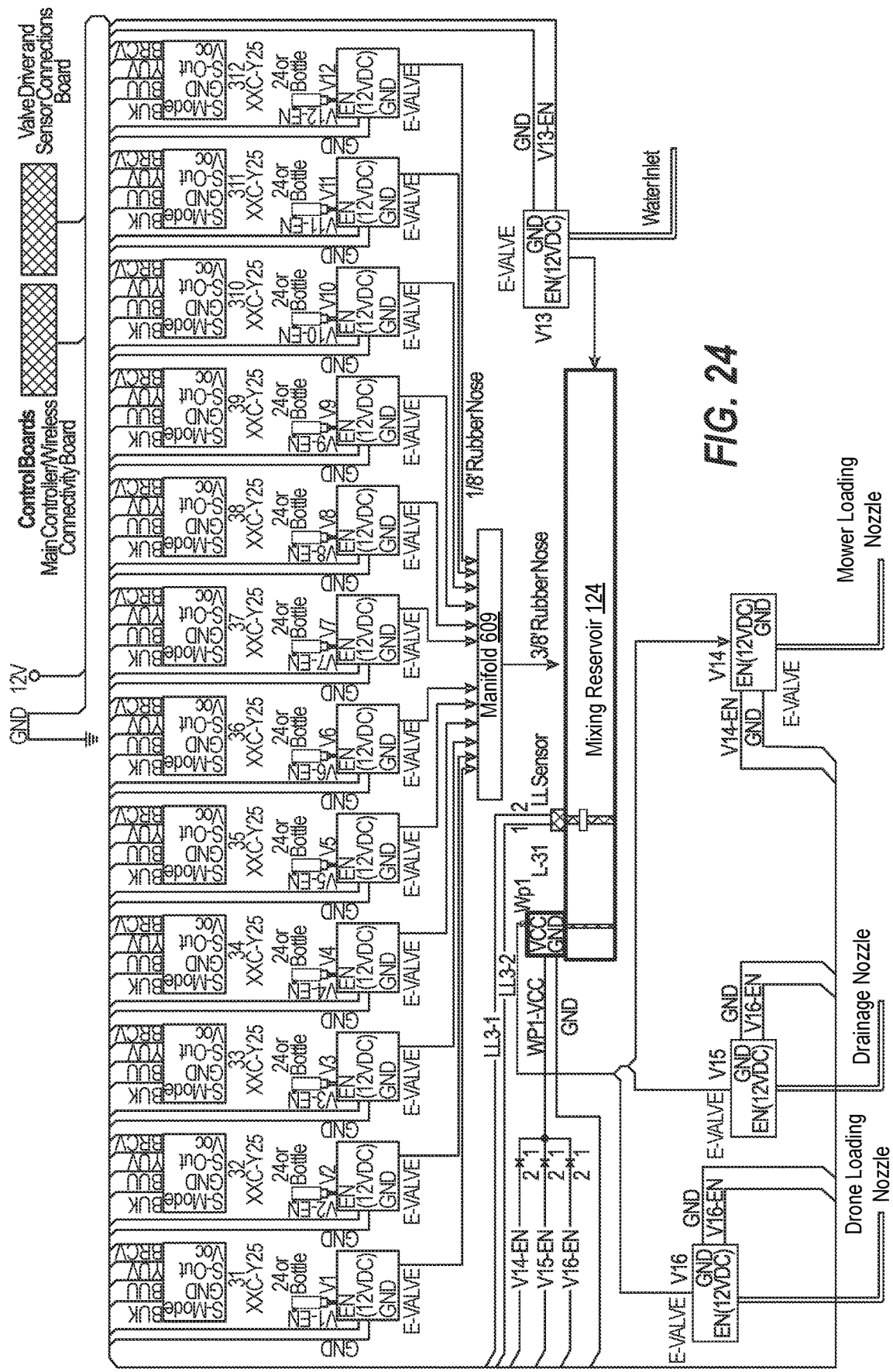

FIG. 24 is a non-limiting example of a circuit that may be implemented in the retrieval and charging station 103. Specifically, each of the containers 121 may have a corresponding e-valve that can be selectively controlled to retrieve solution from respective ones of the containers 121 according to a mixing formula. The solution may be channeled into a manifold 609 via tubing. The manifold 609 may direct the solution into the mixing reservoir 124 along with water via a water line e-valve.

Figure 25:
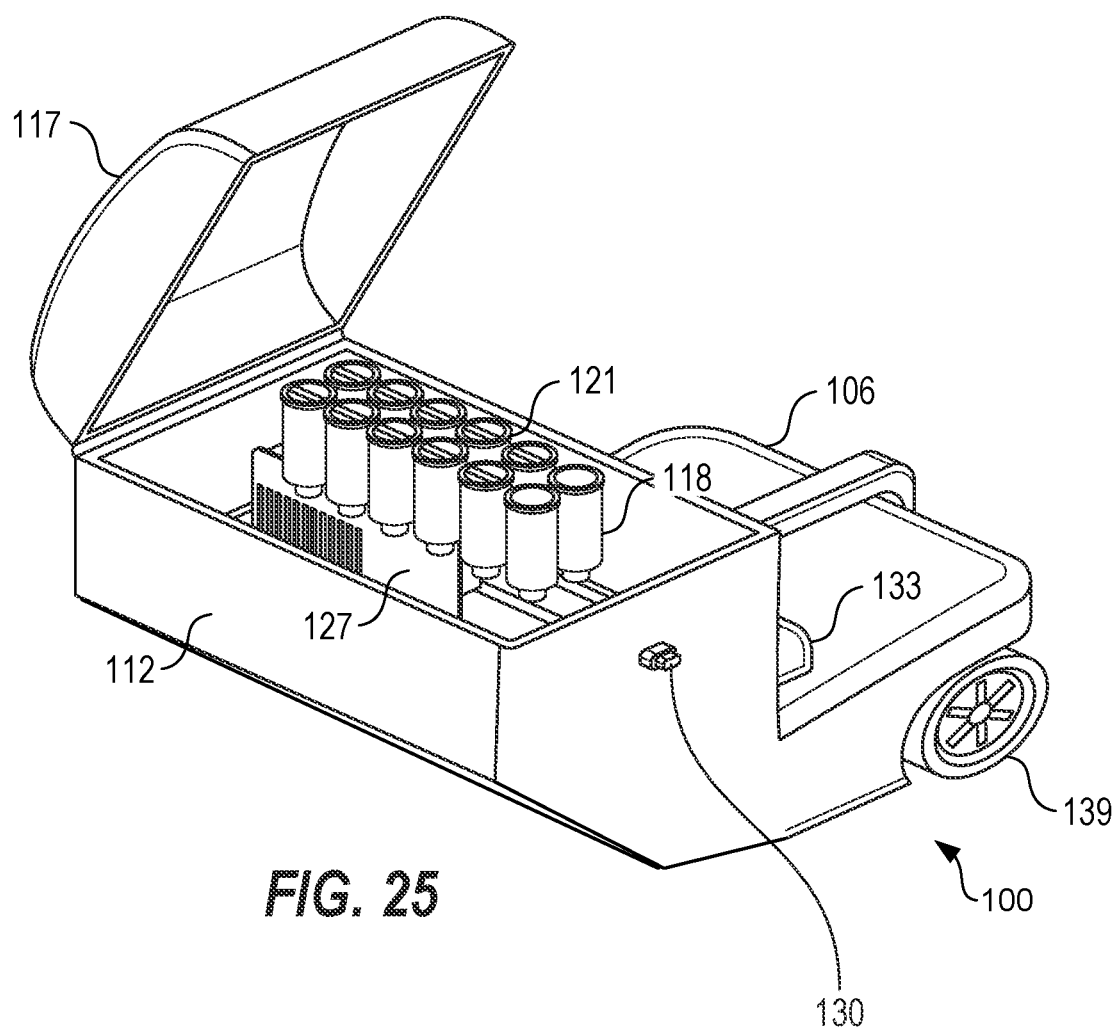
FIG. 25 is an example of a system for automated lawn chemical treatment having a vehicle and an integrated mixing station according to various embodiments.

FIG. 25 is another example of a system for automated lawn chemical treatment having a vehicle and an integrated mixing station according to various embodiments. While various embodiments described herein show the solution retrieval portion 108 being part of a retrieval and charging station 103, in some embodiments, the solution retrieval portion 108 is integrated with the vehicle 106. Accordingly, the one or more containers 121 may be configured to be detachably attach to the container receptacles 118 on the vehicle 106. For instance, a container 121 may nest in or otherwise engage with a respective one of the container receptacles 118 such that the container 121 becomes fluidly coupled to tubing 122, a mixing reservoir 124, and/or other components, as will be described. Processing circuitry of the vehicle 106 may form a wired connection with processing circuitry of the solution retrieval portion 108. One of the vehicle reservoir 133 and the mixing reservoir 124 may not be required as a single mixing reservoir may instead be used for treatment. The mixing operations in conjunction with or independent of the computing environment 203 may be the same as described above and will not be repeated for brevity.

Figure 26:
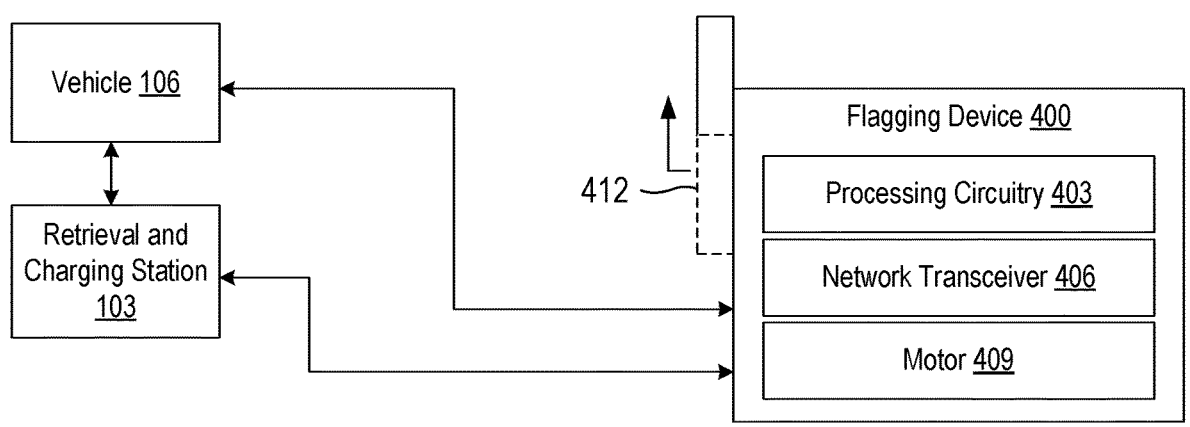
FIG. 26 is an example of a flagging device for automated lawn chemical treatment according to various embodiments.

Turning now to FIG. 26, an example of a flagging device 300 is shown according to various embodiments. The flagging device 400 may include processing circuitry 403, a network transceiver 406, a motor 409, and/or a flag 412 or other visual indicator. It is understood that, when a treatment of a lawn or other area has been completed, the vehicle 106 and/or the retrieval and charging station 103 may communicate a notification to the flagging device 400 that causes the flagging device 400 to transition the flag 412 from a first state (e.g., in a downward state) to a second state (e.g., in an upward state), where the second state is indicative of the treatment of the lawn being complete. In some embodiments, the motor 409 may be employed to transition the flag 412 from the first state to the second state and vice versa. In various embodiments, after the flagging device 400 has transitioned the flag 412 to the second state (indicative of a recent treatment), the flagging device 400 may revert the flag 412 to the first state after a predefined period of time has elapsed. The foregoing operations of the flagging device 400 may be performed by the processing circuitry 403, as may be appreciated. In various embodiments, the vehicle 106 and/or the retrieval and charging station 103 may communicate with a flagging device 300 via a wired or wireless connection. While a flag 412 is shown, in alternative embodiments, a display device (e.g., an LCD or OLED display device) may be employed to display a message, such as "Treatment Performed on Date," where date is the date and/or time of treatment. In sum, a notification may be sent from at least one of the vehicle 106 and the retrieval and charging station 103 to the flagging device 400 that directs the flagging device 400 to indicate a recent treatment of an area, for example, by transitioning the flag 412 from a first state to a second state, where the second state is indicative of a recent treatment of a lawn or other area.

The vehicle 106, the computing environment 203, and/or the retrieval and charging station 103 may include memory or a memory device. Stored in the memory device are both data and several components that are executable by the processor. Also stored in the memory can be a data store, firmware, and other data. A number of software components are stored in the memory and executable by a processor (e.g., at least one hardware processor). In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, RAM, ROM, hard drive, solid-state drive, USB flash drive, memory card, optical disc such as compact disc (CD) or digital versatile disc (DVD), floppy disk, magnetic tape, or other memory components.

Memory may include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface may include additional systems designed to coordinate this communication, including, for example, performing load balancing. The processor can be electric or of some other available construction.

Client devices 206 may be used to access user interfaces 603 generated to configure or otherwise interact with the computing environment 203. These client devices 206 may include a display upon which a user interface generated by a client application for providing a virtual desktop session (or other session) can be rendered. In some examples, the user interface can be generated using user interface data provided by the computing environment 203. The client device 206 can also include one or more input/output devices that may include, for example, a capacitive touch-screen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies may include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that may include program instructions to implement the specified logical function(s). The program instructions can be embodied in the form of source code that may include human-readable statements written in a programming language or machine code that may include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic may include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

The features, structures, or characteristics described above may be combined in one or more embodiments in any suitable manner, and the features discussed in the various embodiments are interchangeable, if possible. In this regard, the discussion on various embodiments, various alternative embodiments, and/or various optional embodiments is not exclusive or limiting. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. If a component is described as having "one or more" of the component, it is understood that the component can be referred to as "at least one" component.

The terms "first," "second," etc. are used only as labels, rather than a limitation for a number of the objects. It is understood that if multiple components are shown, the components may be referred to as a "first" component, a "second" component, and so forth, to the extent applicable. If a component is described as being "one or more" components, it is intended that "at least one" component is disclosed within the subject matter of the present disclosure. Similarly, if a component is described as being "at least one" component, it is intended that "one or more" of the component is disclosed within the subject matter of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and clauses, and protected by the following claims.

Therefore, the following is claimed:

1. A system for treatment of a lawn or other area, comprising:

at least one computing device comprising at least one hardware processor;

a retrieval and charging station, comprising:

a plurality of container receptacles;

a plurality of containers configured to be detachably attached to the container receptacles;

a mixing reservoir fluidly connected to the containers;

at least one charging contact;

a networking module configured to communicate with the at least one computing device remotely over a network; and processing circuitry configured to identify contents of the plurality of containers, send a list of the plurality of containers to the at least one computing device over the network, retrieve a mixing formula from the at least one computing device determined based at least in part on the list of the contents over the network, and selectively direct portions of liquid from the plurality of containers into the mixing reservoir such that the portions of the liquid are mixed, thereby generating a treatment solution in accordance with the mixing formula; and a vehicle configured to traverse the lawn or the other area, the vehicle comprising:
  a vehicle reservoir;
  a battery;
  processing circuitry configured to engage with the at least one charging contact to initiate a charging of the battery of the vehicle and fluidly engage with the mixing reservoir to fill the vehicle reservoir with the treatment solution; and
  an applicator configured to treat the lawn or the other area with the treatment solution as the vehicle navigates the lawn or the other area.

2. The system according to claim 1, wherein the at least one computing device comprises program instructions stored in memory that, when executed, direct the at least one computing device to:
  generate the mixing formula based on the list of the containers, a solution level of solution in respective ones of the containers, and environmental data associated with a location of at least one of the retrieval and charging station and the vehicle.

3. The system according to claim 1, wherein:
  each of the containers comprises a radio-frequency identification (RFID) tag that emits an identifier for a respective one of the containers; and
  the processing circuitry of the retrieval and charging station is configured to correlate the identifier with a database of identifiers to identify the contents of the respective one of the containers.

4. A system for treatment of a lawn or other area, comprising:
  a retrieval and charging station comprising a plurality of containers detachably attachable to the retrieval and charging station, a mixing reservoir fluidly connected to the containers, at least one charging contact, and processing circuitry configured to selectively direct portions of liquid from the plurality of containers into the mixing reservoir such that the portions of the liquid are mixed, thereby generating a treatment solution based at least in part on contents of the plurality of containers as identified; and
  a vehicle configured to traverse the lawn or the other area, the vehicle comprising a vehicle reservoir, a battery, and processing circuitry configured to engage with the at least one charging contact to initiate a charging of the battery of the vehicle and fluidly engage with the mixing reservoir to fill the vehicle reservoir with the treatment solution,
  wherein the vehicle further comprises an applicator, the vehicle being configured to navigate the lawn or the other area and treat the lawn or the other area with the treatment solution via the applicator.

5. The system according to claim 4, wherein:
  the retrieval and charging station comprises a networking module;
  the processing circuitry of the retrieval and charging station is configured to communicate with at least one remote computing device via the networking module over a network to retrieve mixing instruction data remotely from the retrieval and charging station; and
  the mixing instruction data instructs the processing circuitry of the retrieval and charging station to selectively direct the portions of the liquid from the plurality of containers in accordance with a predetermined mixing formula.

6. The system according to claim 5, wherein the at least one remote computing device comprises program instructions stored in memory that, when executed, direct the at least one computing device to:
  generate the mixing instruction data based on a list of the containers, a solution level of solution in respective ones of the containers, and environmental data associated with a location of at least one of the retrieval and charging station and the vehicle.

7. The system according to claim 6, wherein:
  the vehicle comprises a networking module;
  the processing circuitry of the vehicle is configured to communicate with the retrieval and charging station via respective networking modules to notify the retrieval and charging station of a current level of the vehicle reservoir; and
  the processing circuitry of the retrieval and charging station pumps an amount of the treatment solution to the vehicle based at least in part on the current level of the vehicle reservoir.

8. The system according to claim 4, wherein the applicator is a sprayer.

9. The system according to claim 4, wherein the vehicle is a land-based vehicle comprising a plurality of wheels, the processing circuitry of the land-based vehicle being configured to direct the land-based vehicle to traverse the lawn or the other area and apply the treatment solution.

10. The system according to claim 4, wherein the vehicle is an unmanned aerial vehicle (UAV) comprising a plurality of rotors, the processing circuitry of the unmanned aerial vehicle being configured to direct the unmanned aerial vehicle to fly above the lawn or the other area and apply the treatment solution at a predetermined height relative to a ground surface.

11. The system according to claim 4, wherein:
  each of the containers comprises a radio-frequency identification (RFID) tag that emits an identifier for a respective one of the containers; and
  the processing circuitry of the retrieval and charging station is configured to correlate the identifier with a database of identifiers to identify contents of the respective one of the containers.

12. The system according to claim 4, wherein each of the containers comprises an air-flow valve that enables solution contained therein to be gravity-fed to tubing of the retrieval and charging station.

13. A method for treatment of a lawn or other area, comprising:
  providing a retrieval and charging station comprising a plurality of containers detachably attachable to the retrieval and charging station, a mixing reservoir fluidly connected to the containers, at least one charging contact, and processing circuitry;
  identifying, by the processing circuitry of the retrieval and charging station, contents of the plurality of containers;
  selectively directing, by the processing circuitry of the retrieval and charging station, portions of liquid from the plurality of containers into the mixing reservoir such that the portions of the liquid are mixed, thereby generating a treatment solution based at least in part on the contents of the plurality of containers as identified;
  providing a vehicle configured to traverse the lawn or other area, the vehicle comprising a vehicle reservoir, a battery, and processing circuitry;
  engaging, by the vehicle as directed by the processing circuitry, with the at least one charging contact to initiate a charging of the battery of the vehicle, and fluidly engaging with the mixing reservoir to fill the vehicle reservoir with the treatment solution; and navigating the vehicle over the lawn or the other area and treating the lawn or the other area with the treatment solution via an applicator of the vehicle.

14. The method according to claim 13, wherein:
the retrieval and charging station comprises a networking module;
the method further comprises communicating, by the processing circuitry of the retrieval and charging station, with at least one remote computing device via the networking module over a network to retrieve mixing instruction data remotely from the retrieval and charging station; and
the mixing instruction data instructs the processing circuitry of the retrieval and charging station to selectively direct the portions of the liquid from the plurality of containers in accordance with a predetermined mixing formula.

15. The method according to claim 14, further comprising:
generating, by the remote computing device, the mixing instruction data based on a list of the containers, a solution level of solution in respective ones of the containers, and environmental data associated with a location of at least one of the retrieval and charging station and the vehicle.

16. The method according to claim 15, wherein:
the vehicle comprises a networking module;
the method further comprises communicating, by the processing circuitry of the vehicle, with the retrieval and charging station via respective networking modules to notify the retrieval and charging station of a current level of the vehicle reservoir; and
the method further comprises directing pumping, by the processing circuitry of the retrieval and charging station, an amount of the treatment solution to the vehicle based at least in part on the current level of the vehicle reservoir.

17. The method according to claim 13, wherein the applicator is a sprayer.

18. The method according to claim 13, wherein the vehicle is a land-based vehicle comprising a plurality of wheels, the processing circuitry of the land-based vehicle being configured to direct the land-based vehicle to traverse the lawn or the other area and apply the treatment solution.

19. The method according to claim 13, wherein:
each of the containers comprises a radio-frequency identification (RFID) tag that emits an identifier for a respective one of the containers; and
correlating, by the processing circuitry of the retrieval and charging station, the identifier with a database of identifiers to identify contents of the respective one of the containers.

20. The method according to claim 13, wherein each of the containers comprises an air-flow valve that enables solution contained therein to be gravity-fed to tubing of the retrieval and charging station.

* * * * *